(12) United States Patent
Onodera

(10) Patent No.: US 8,713,500 B2
(45) Date of Patent: Apr. 29, 2014

(54) COMPUTER PROGRAM AND APPARATUS FOR EVALUATING SIGNAL PROPAGATION DELAYS

(75) Inventor: Mitsuru Onodera, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 675 days.

(21) Appl. No.: 12/552,015

(22) Filed: Sep. 1, 2009

(65) Prior Publication Data

US 2009/0319972 A1    Dec. 24, 2009

Related U.S. Application Data

(63) Continuation of application No. PCT/JP2007/056688, filed on Mar. 28, 2007.

(51) Int. Cl.
| | |
|---|---|
| *G06F 17/50* | (2006.01) |
| *G01R 29/02* | (2006.01) |
| *G01R 19/00* | (2006.01) |
| *H03L 5/00* | (2006.01) |

(52) U.S. Cl.
USPC ........... 716/113; 716/106; 716/111; 716/122; 716/132; 716/136; 327/37; 327/62; 327/307

(58) Field of Classification Search
USPC ......... 716/106, 111, 113, 132, 134, 136, 122; 327/37, 62, 307
See application file for complete search history.

(56) References Cited

U.S. PATENT DOCUMENTS

| | | | | | |
|---|---|---|---|---|---|
| 4,306,194 | A | * | 12/1981 | Chapman ........................ | 327/62 |
| 4,513,207 | A | * | 4/1985 | Bloomer ........................ | 307/126 |
| 4,641,246 | A | * | 2/1987 | Halbert et al. ................. | 341/163 |
| 5,377,202 | A | * | 12/1994 | Bryson et al. ................. | 714/740 |
| 5,481,129 | A | * | 1/1996 | DeJong et al. ................ | 257/360 |
| 5,659,261 | A | * | 8/1997 | Bacrania et al. .............. | 327/112 |
| 5,889,677 | A | * | 3/1999 | Yasuda et al. ................. | 716/113 |
| 6,012,833 | A | | 1/2000 | Yoshikawa | |
| 6,304,998 | B1 | | 10/2001 | Kamiya et al. | |
| 6,432,731 | B1 | * | 8/2002 | Kuroiwa ......................... | 438/14 |
| 6,571,376 | B1 | * | 5/2003 | Levin et al. ................... | 716/113 |
| 6,654,938 | B2 | * | 11/2003 | Kosugi .......................... | 716/108 |
| 6,940,356 | B2 | * | 9/2005 | McDonald, II et al. ........ | 331/16 |

(Continued)

FOREIGN PATENT DOCUMENTS

| | | |
|---|---|---|
| EP | 0 845 810 A1 | 6/1998 |
| JP | 07-065041 A | 3/1995 |

(Continued)

OTHER PUBLICATIONS

Daga et al.; "Delay modelling improvement for low voltage applications"; Publication Year: 1995; Design Automation Conference, 1995, with EURO-VHDL, Proceedings EURO-DAC '95., European; pp. 216-221.*

*Primary Examiner* — Helen Rossoshek

(74) *Attorney, Agent, or Firm* — Arent Fox LLP

(57) ABSTRACT

A computer executes a signal delay evaluation program to determine whether reference levels used to define slew rates of a first circuit block are different from those used for a second circuit block that receives an output signal from the first circuit block. The computer corrects an output slew rate of the output signal supplied from the first circuit block to the second circuit block, based on a difference in the reference levels that is found between the first and second circuit blocks.

14 Claims, 21 Drawing Sheets

(56) References Cited

U.S. PATENT DOCUMENTS

| | | | |
|---|---|---|---|
| 7,098,716 B2 * | 8/2006 | Ono | 327/307 |
| 7,215,274 B2 * | 5/2007 | Liu | 341/156 |
| 7,348,840 B2 * | 3/2008 | Magrath et al. | 330/10 |
| 7,523,430 B1 * | 4/2009 | Patel | 716/115 |
| 7,992,119 B1 * | 8/2011 | Iotov et al. | 716/119 |
| 2007/0136705 A1 * | 6/2007 | Hosono | 716/6 |
| 2008/0216033 A1 * | 9/2008 | Bucossi et al. | 716/6 |

FOREIGN PATENT DOCUMENTS

| | | |
|---|---|---|
| JP | 08-63509 A | 3/1996 |
| JP | 10-162040 A | 6/1998 |
| JP | 10-270564 A | 10/1998 |
| JP | 2000-286342 A | 10/2000 |

* cited by examiner

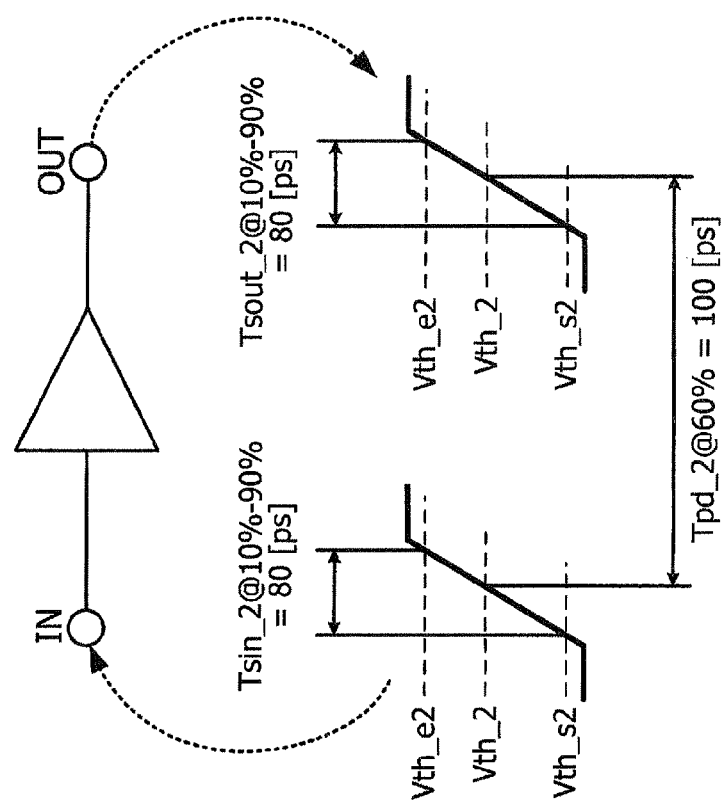
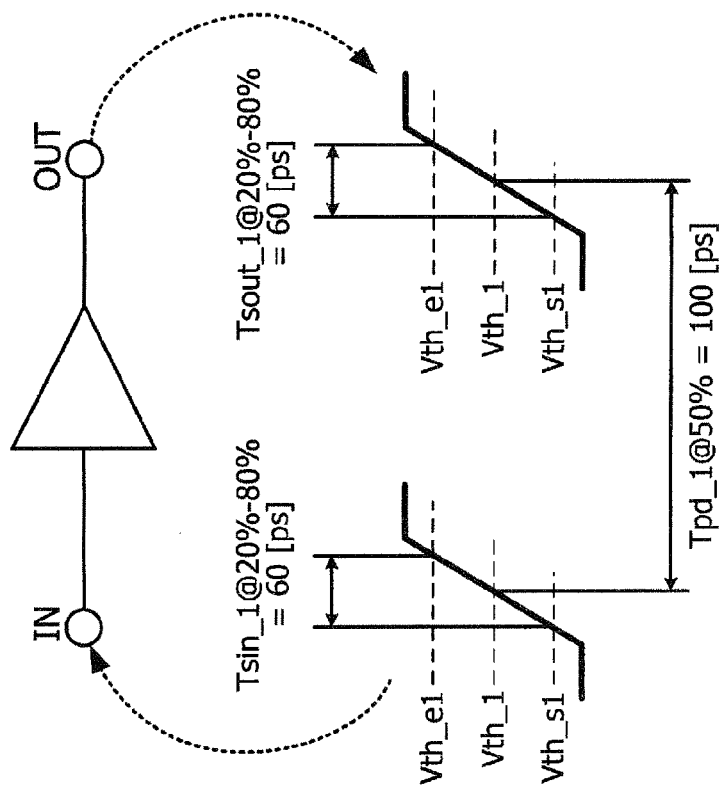

| PLATFORM NAME | INTERFACE | Tpd THRESHOLD | Ts THRESHOLD |
|---|---|---|---|
| A1 | CMOS | 50% | 20% - 80% |
| | SCHMITT | Vth@Tr=55%, Vth@Tf=45% | 20% - 80% |
| A2 | CMOS | 50% | 20% - 80% |
| | SCHMITT | Vth@Tr=55%, Vth@Tf=45% | 20% - 80% |
| A3 | CMOS | 40% | 10% - 90% |
| | SCHMITT | Vth@Tr=55%, Vth@Tf=45% | 10% - 90% |
| A4 | CMOS | 40% | 10% - 90% |
| | SCHMITT | Vth@Tr=55%, Vth@Tf=45% | 10% - 90% |

US 8,713,500 B2

COMPUTER PROGRAM AND APPARATUS FOR EVALUATING SIGNAL PROPAGATION DELAYS

This application is a continuing application, filed under 35 U.S.C. §111(a), of International Application PCT/JP2007/056688, filed Mar. 28, 2007.

FIELD

The embodiments described herein relate to a computer program and apparatus for evaluating signal propagation delays.

BACKGROUND

There is an increasing need for more integrated and function-rich electronic devices. To meet such a need, various forms of packaging and integration techniques have been developed and used, from printed circuit board (PCB) populated with semiconductor chips to System-on-a-Chip (SoC) and System-in-Package (SiP) devices.

Generally the design flow of an electronic device involves verification of signal timings. Timing verification tools are supposed to provide accurate delay estimation so as to evaluate the delay of signals propagating through a circuit network. This requirement applies also to the highly integrated and sophisticated electronic devices mentioned above.

An electronic circuit system may be designed either on a single platform, as in the case of SoC, or on multiple platforms. Different methods are used to verify the system depending on this difference. More specifically, the qualification of "on a single platform" refers to, for example, the case where circuit blocks used in the electronic device in question were designed by the same vendor. Another case is where such circuit blocks will be fabricated by using the same manufacturing process. Yet another case is where such circuit blocks were designed on a uniform development environment (e.g., calculating signal delays with the same set of formulas, extracting library parameters under the same conditions, and using the same computer-aided design (CAD) tools).

The general outlines of the above-noted two types of timing verification methods will be described below, beginning with an example of a uni-platform system. FIG. 15 illustrates a structure of an SoC. The illustrated semiconductor device, or SoC, 500 includes two circuit modules M1 and M2. These circuit modules M1 and M2 were designed on a single platform, hence uni-platform modules. Specifically, the first circuit module M1 is formed from four buffers 111 to 114 and one latch circuit FF1. An input data signal given to data input terminal IN1 of the semiconductor device 500 is routed to the first circuit module M1 and propagates through its input terminal A1, buffer 111, latch circuit FF1, buffer 112, and output terminal X1 in that order before it is sent out to the second circuit module M2. A clock signal given to clock input terminal CK of the semiconductor device 500 is routed to the first circuit module M1 and propagates through its clock input terminal CK1, buffers 113 and 114, and clock output terminal CK01 in that order before it is sent out to the second circuit module M2. The latch circuit FF1 operates with a clock signal supplied via the buffer 113.

Similar to the first circuit module M1 described above, the second circuit module M2 is formed from four buffers 121 to 124 and one latch circuit FF2. The output data signal of the first circuit module M1 is routed to the second circuit module M2 and propagates through input terminal A2, buffer 121, latch circuit FF2, and buffer 122, and output terminal X2 in that order before it is sent out from an output terminal OUT1 of the semiconductor device 500. The clock output signal of the first circuit module M1 is routed to the second circuit module M2 and propagates through its clock input terminal CK2, buffers 123 and 124, and clock output terminal CKO2 before it is sent out from a clock output terminal CKO of the semiconductor device 500. The latch circuit FF2 operates with a clock signal supplied from via the buffer 123.

To verify such a system of uni-platform circuit modules or blocks, the timing verification process collects delay data for each of the data and clock paths in the entire system and subjects the collected data to a circuit simulator or a static timing analysis (STA) tool. In the present case, the unified specifications of libraries corresponding to those circuit blocks make it possible to calculate system-level signal delays straight away from design data values extracted from the libraries.

FIG. 16 illustrates an example of library specifications used for delay verification. Specifically, FIG. 16 depicts a buffer 140 formed from two complementary metal-oxide semiconductor (CMOS) inverters as an example of a circuit block provided in a library used in delay verification. As can be seen in FIG. 16, typical library parameters include terminal-to-terminal delays Tpd and slew rates. Slew rate parameters include input slew rate Tsin corresponding to the input end of a circuit block, and output slew rate Tsout corresponding to the output end of the same.

The terminal-to-terminal delay Tpd of a circuit block denotes the amount of propagation delay between an input and its corresponding output of that block. More specifically, this parameter Tpd is defined based on the time points at which the input signal VIN and output signal VOUT cross a predetermined threshold. The threshold may be defined as a percentage of voltage level to the maximum amplitude of signals (e.g., 50% in the example of FIG. 16).

The slew rate represents the rate of change of a signal at its rising edge or falling edge, which is expressed as, for example, the time between the start and end points of that change. The actual signals may, however, exhibit a slow change at the beginning of their transitions. They may also have an overshoot and undershoot at the end of their rising and falling transitions, respectively. For these reasons, the definition of slew rates disregards both the beginning and ending portions of transitions, but focuses on the central portion where the signal keeps changing in a relatively linear fashion. Referring to the example of FIG. 16, the thresholds designating the start point and end point of a rising transition are set to 20% and 80%, respectively, of the maximum amplitude.

Signal delays produced in a circuit actually involve several factors. One is known as the gate delay, which refers to the inherent delay of a circuit. Another is a slew rate dependent delay, which refers to the variation of terminal-to-terminal delay Tpd due to changes of input signal slew rate Tsin. Yet another factor is a load capacitance dependent delay, which refers to the variation of output slew rate Tsout due to changes of output load capacitance CL under the condition of a fixed input slew rate Tsin. Unlike the latter two delay factors, the gate delay has no dependency on the slew rate or load capacitance.

FIGS. 17A and 17B illustrate an example of what the library provides in table form. Referring to FIG. 17A, the library provides a Tpd table representing the slew rate dependent signal delay noted above, as a collection of terminal-to-terminal delay values Tpd at various points of output load capacitance CL and input signal slew rate Tsin. Referring to FIG. 17B, the library also provides a Tsout table representing the load capacitance dependent delay noted above, as a collection of output slew rate values Tsout at various points of output load capacitance CL and input signal slew rate Tsin. The library stores those sets of delay data for each type of cells used in circuit blocks.

Signal delays in an electronic device may be calculated with various ways, depending on the vender, process, and design tool used. For example, one ordinary calculation method begins with defining constraints for input buffers according to the slew rate of signals supplied from an external source. Other constraints are wire capacitance (capacitance of wires to succeeding circuits or cells) and pin capacitance. The ordinary method determines output slew rate values Tsout by applying those constraints when it looks up the Tsout table discussed above.

The method handles internal circuits (cells) of a semiconductor chip in a similar way. That is, the method assigns parameters of a preceding circuit to a succeeding circuit as part of its constraints. For example, the output slew rate of the preceding circuit will be included in the constraints, together with the wire and pin capacitance associated with the succeeding circuit. For output buffers, the method defines their constraints from, for example, the output slew rate of preceding circuits. Also determined as a constraint is output load capacitance of those output buffers. More specifically, the output load capacitance of a buffer can be calculated from, among others, the input capacitance of its succeeding circuit block, which is described in the library of that circuit block. When the constraints are defined, the terminal-to-terminal delay Tpd of each cell in the system can then be obtained by looking up the above-described Tpd table with those constraint values.

FIG. 18 illustrates a structure of a PCB as an example of a system formed from circuit blocks designed on different platforms. An example of a timing verification method for this system will now be described below, with reference to this FIG. 18 and subsequent drawings.

Mounted on the PCB 600 of FIG. 18 are two semiconductor chips CP1 and CP2 from different vendors. Those semiconductor chips CP1 and CP2 have the same circuit structure as what have been discussed as circuit modules M1 and M2 in FIG. 15. Accordingly, FIG. 18 uses the same reference numerals and symbols as FIG. 5 for the corresponding components.

Conventionally the timing verification of an electronic device containing such multi-vendor circuit blocks is performed in two stages. The first stage verifies each semiconductor chip one by one, and the second stage verifies the interface portions connecting those semiconductor chips with each other.

FIG. 19 illustrates the first stage of timing verification which evaluates each individual semiconductor chip used in a PCB. Signal delays and timings in a chip are verified through circuit simulation or static timing analysis (STA) with a set of external constraints for the chip, including input signal specifications and output load conditions. Referring to, for example, the first semiconductor chip CP1 illustrated in the left half of FIG. 19, the verification process for this chip starts with determining the input signal slew rates Tsin and skews for use as the chip's input constraints, taking into consideration the conditions of external signals supplied from off-board sources (step S21). The process then determines the output load capacitance of the first semiconductor chip CP1 as output constraints, taking into consideration the input pin capacitance of the succeeding chip CP2 and associated wiring capacitance (step S22). Those two steps S21 and S22 permit calculation of the terminal-to-terminal delay Tpd of each cell in the first semiconductor chip CP1.

The verification process then defines input constraints of the second semiconductor chip CP2 (step S23). Specifically, the output slew rates Tsout of the first semiconductor chip CP1 are used as part of input constraints of the second semiconductor chip CP2. Other input constraints include skews and other parameters related to the signals supplied from the first semiconductor chip CP1 to the second semiconductor chip CP2. Those parameters come from the results of, for example, a static timing analysis which has been performed on the first semiconductor chip CP1. The verification process then determines output constraints of the second semiconductor chip CP2 (step S24) including the output load capacitance of each signal that goes out of the board, based on the wire capacitance and other parameters associated with those outgoing signals. Steps S23 and S24 permit calculation of the terminal-to-terminal delay Tpd of each cell, in the second semiconductor chip CP2. In this way, the first stage of the verification process calculates signal delays and performs circuit simulation and STA for each individual circuit block contained in the board.

FIG. 20 illustrates chip-to-chip timing verification in a PCB development process. This is what has been mentioned as the second stage of verification process, which uses a board simulator to verify the timing design by using the input and output signal paths of each circuit block and their associated transmission line models. For illustrative purposes, FIG. 20 focuses on the output buffers 115 and 116 of the first semiconductor chip CP1 and the input buffers 125 and 126 of the second semiconductor chip CP2. This portion of the PCB 600 is subjected to the board simulator so as to verify the timing of propagating signals. The verification process uses the information on slew rates and skews in the first semiconductor chip CP1 to define a set of input constraints for the second semiconductor chip CP2 (step S31). The verification process observes the output of each input buffer 125 and 126 to determine whether those output signals change their states as expected (step S32).

The above-described two-stage verification process intends to ensure the system-level timing design of an electronic device containing multiple circuit blocks designed on different platforms. However, the circuit simulation and STA performed during this process does not actually test the designed system as a whole.

As another technique related to the above-described timing verification process, Japanese Laid-open Patent Publication No. 7-65041 (1995) proposes an adaptive method of evaluating signal delays. Considering the fact that design data may be given as a mixture of components at different design levels, the proposed method changes the way of calculating delays depending on the design level of each section of design data, according to some other data defining which circuit sections to evaluate (see, for example, paragraphs Nos. 0017 to 0027 and FIG. 5 of the noted publication). The proposed method, however, does not assume that the design data may include components developed on different vendor platforms.

As yet another related technique, Japanese Laid-open Patent Publication No. 2000-286342 proposes a layout design method for a large-scale integrated (LSI) circuit using intellectual property (IP) cores. This method places appropriate buffers between IP cores so as to satisfy their timing requirements. By so doing, the proposed method makes it possible to pursue the timing design of circuits outside the IP cores independently of the internal timing design of the IP cores (see, for example, paragraph Nos. 0025 to 0032 and FIG. 1 of the noted publication).

The timing design of an electronic device is verified through a system-level circuit simulation or STA using signal delay data calculated for all constituent circuit blocks. This approach is, however, not possible in some type of devices like the foregoing PCB 600 because their constituent circuit blocks are based on different platforms. That is, the difference of their development platforms introduces an error in the results of delay calculation. More specifically, this error derives from the fact that different platforms use different definitions of terminal-to-terminal delays, as well as determining slew rates with different thresholds.

FIG. 21 illustrates delay data errors that could be introduced when evaluating signals propagating from one circuit block to another. Specifically, FIG. 21 gives a simplified example of delay data errors associated with a signal propagating between the first and second semiconductor chips CP1 and CP2 discussed in FIG. 18. For the first semiconductor chip CP1, its terminal-to-terminal delay Tpd is defined at 50% of full amplitude, and its slew rate is defined to be the time for a signal to change from 20% to 80% of its full amplitude. For the second semiconductor chip CP2, on the other hand, its terminal-to-terminal delay Tpd is defined at 60% of full amplitude, and its slew rate is defined to be the time for a signal to change from 10% to 90% of its full amplitude.

Referring to FIG. 21, the first semiconductor chip CP1 contains an output buffer 115 with a terminal-to-terminal delay of Tpd_11 measured with the 50% threshold. On the other hand, the second semiconductor chip CP2 contains an input buffer 125 with a terminal-to-terminal delay of Tpd_12 measured with the 60% threshold. The total delay of those circuits in the semiconductor chips CP1 and CP2 is calculated by adding up their respective delays Tpd_11 and Tpd_12. The result contains, however, an error Tpd_err due to the different threshold definitions of CP1 and CP2. That is, the true delay time is greater than the sum of Tpd_11 and Tpd_12 by this error Tpd_error, as in the case illustrated in FIG. 21. The same error Tpd_err may act the other way around in some other cases. That is, in the case of falling edge, the sum of Tpd_11 and Tpd_12 includes this Tpd_err two times.

Similarly, a difference in the slew rate threshold would produce an error Ts_err in slew rate calculation. Think of, for example, the output slew rate Tsout of the first semiconductor chip CP1. If this Tsout is used as a constraint on the input buffer 125 of the second semiconductor chip CP2, the calculated delay time value may fall short by Ts_err or may include this Ts_err two times, depending on the edge. Accordingly, the user cannot obtain correct verification results.

SUMMARY

According to an aspect of the present invention, there is provided a computer-readable storage medium storing a computer program for evaluating signal propagation delays in an electronic device including a plurality of circuit blocks. When executed on a computer, the computer program causes the computer to perform a method comprising: determining whether reference levels used to define slew rates of a first circuit block are different from those used for a second circuit block that receives an output signal from the first circuit block; and correcting an output slew rate of the output signal supplied from the first circuit block to the second circuit block, based on the difference in the reference levels that is found between the first and second circuit blocks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B illustrate specifications of cells in a semiconductor chip;

FIG. 8 illustrates an example of platform information stored as a basis of constraints;

DESCRIPTION OF EMBODIMENTS

Figure 1:
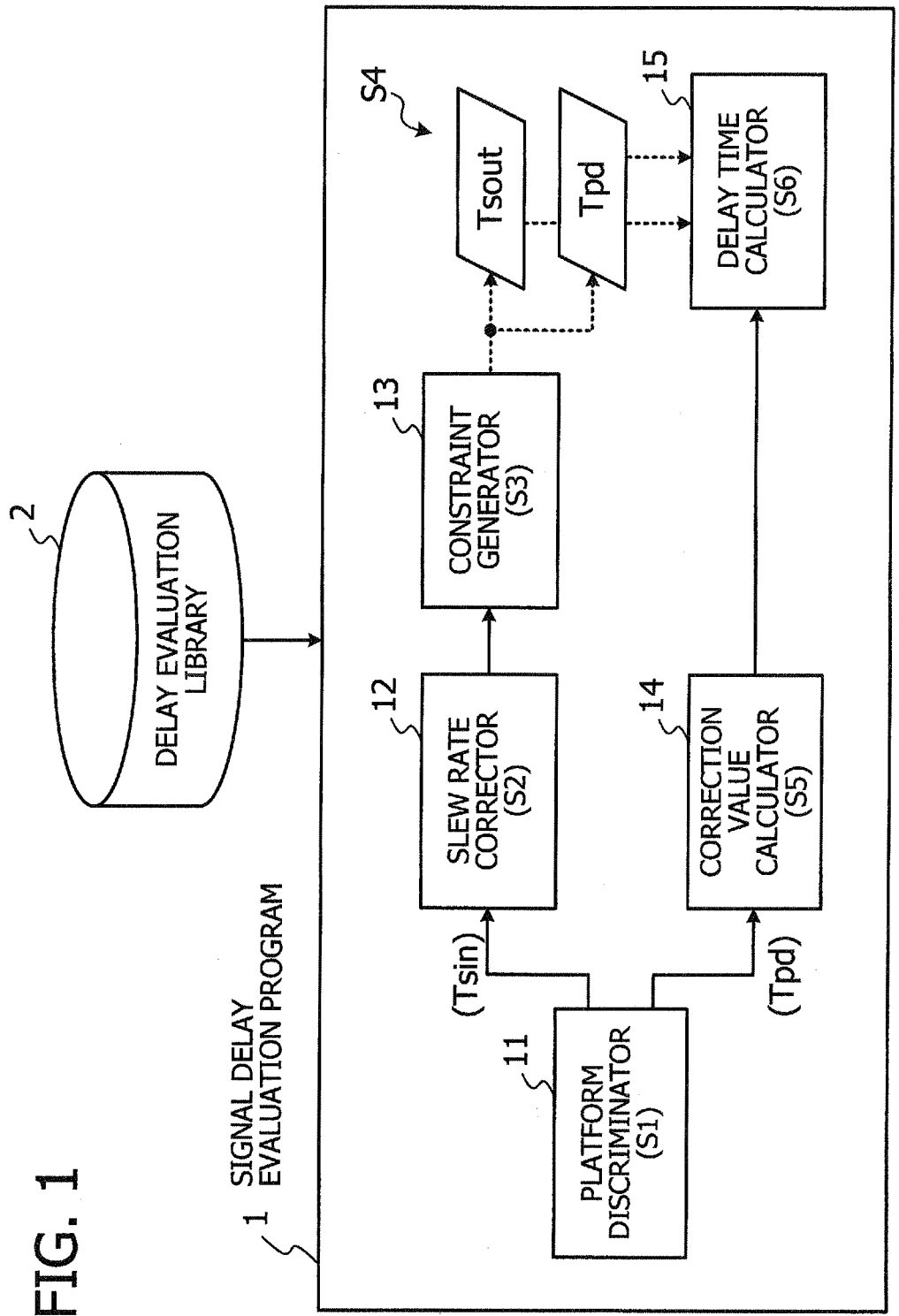
FIG. 1 is a block diagram illustrating functions of a signal delay evaluation program according to an embodiment.

Preferred embodiments of the present invention will now be described in detail below with reference to the accompanying drawings, wherein like reference numerals refer to like elements throughout.

FIG. 1 is a block diagram illustrating functions of a signal delay evaluation program according to an embodiment. The illustrated signal delay evaluation program 1 is designed to evaluate signal propagation delays in an electronic device containing a plurality of circuit blocks. Here the term "electronic device" refers to an apparatus such as, but not limited to, printed circuit board (PCB), system-in-package (SiP) module, system-on-a-chip (SoC) device, or multi-chip module (MCM).

When executed on a computer, the signal delay evaluation program 1 offers the functions of a platform discriminator 11, a slew rate corrector 12, a constraint generator 13, a correction value calculator 14, and a delay time calculator 15. These functional blocks offer their respective services by using a delay evaluation library 2 for reference. The delay evaluation library 2 stores, among other things, design data and delay parameters of circuit blocks to be evaluated.

The illustrated embodiment implements the above functions as a single signal delay evaluation program 1. Those functions, however, may be divided to a plurality of programs for execution by one or more information processing devices such as central processing units (CPUs).

For explanatory purposes, the following section will discuss a simple electronic device containing two circuit blocks. These circuit blocks are referred to as a first circuit block and a second circuit block, the latter receiving signals produced by the former.

The platform discriminator 11 examines entries of the delay evaluation library 2 that correspond to the first and second circuit blocks to determine whether those blocks are based on the same platform (step S1). More specifically, the platform discriminator 11 examines the platform of slew rate and terminal-to-terminal delay Tpd of each circuit block. The slew rate of a signal is defined with specific reference levels to discriminate between voltage levels (e.g., high and low) of that signal. Different platforms may use different reference levels for this purpose. The platform discriminator 11 thus determines whether the reference levels used to define slew rates of one circuit block are different from those used for another circuit block. Likewise, the terminal-to-terminal delay Tpd of a signal is defined with a specific reference level, which may be different from platform to platform. The platform discriminator 11 thus determines whether the reference levels used to define terminal-to-terminal delays Tpd of one circuit block are different from those used for another circuit block.

The slew rate corrector 12 is activated when the platform discriminator 11 has determined that the slew rates in question are based on different platforms. When this is the case, the slew rate corrector 12 corrects the output slew rate Tsout of output signals that the first circuit block produces (step S2), so as to compensate for slew rate errors that derive from the difference of slew-rate reference levels (or "slew rate thresholds" described later) between the platforms.

The constraint generator 13 provides constraints for the purpose of calculating terminal-to-terminal delay Tpd and output slew rate Tsout of cells in a semiconductor chip (step S3). For example, the constraint generator 13 specifies the output slew rate Tsout of output signals produced by the first circuit block as a constraint for calculation of delay times of corresponding front-end cells (e.g., input buffers) of the second circuit block. This output slew rate Tsout has been corrected by the slew rate corrector 12 in the case where the slew rates in question are based on different platforms.

Under the constraints established above, output slew rate Tsout of signals produced by the second circuit block are determined in accordance with design data of the second circuit block which is extracted from the delay evaluation library 2, as well as terminal-to-terminal delays Tpd of front-end cells of the second circuit block (step S4). The determined output slew rate Tsout and terminal-to-terminal delays Tpd are then subjected to the delay time calculator 15. While FIG. 1 depicts no particular functional block corresponding to the above operation of step S4, the described functions may of course be implemented as part of the signal delay evaluation program 1 discussed herein.

As the slew rate corrector 12 corrects slew rate parameters, the correction value calculator 14 calculates correction values for terminal-to-terminal delays Tpd when the platform discriminator 11 has determined that the circuit blocks in question are based on different platforms in terms of terminal-to-terminal delay Tpd. More specifically, the correction value calculator 14 calculates an error of a terminal-to-terminal delay Tpd (referred to as "Tpd error") based on the difference between the platforms in their reference levels (or thresholds described later) used to define terminal-to-terminal delay Tpd. The correction value calculator 14 outputs the calculated Tpd error as a terminal-to-terminal delay correction value (step S5).

The delay time calculator 15 calculates system-level signal delays in the electronic device under evaluation (step S6). For example, the delay time calculator 15 calculates end-to-end signal delays in the first and second circuit blocks as a whole, based on the terminal-to-terminal delays Tpd of individual cells constituting each circuit block. During the course of this calculation, the delay time calculator 15 corrects the Tpd value of each cell with a corresponding terminal-to-terminal delay correction value that the correction value calculator 14 has calculated. This correction compensates for the difference between the circuit block platforms within the same electronic device, thus making it possible to calculate system-level signal delays more accurately.

The data processing operations executed by the signal delay evaluation program 1 of FIG. 1 will now be described in greater detail below. In the following description, the proposed program evaluates a PCB populated with a plurality of semiconductor chips, as an example of an electronic device.

Figure 2:
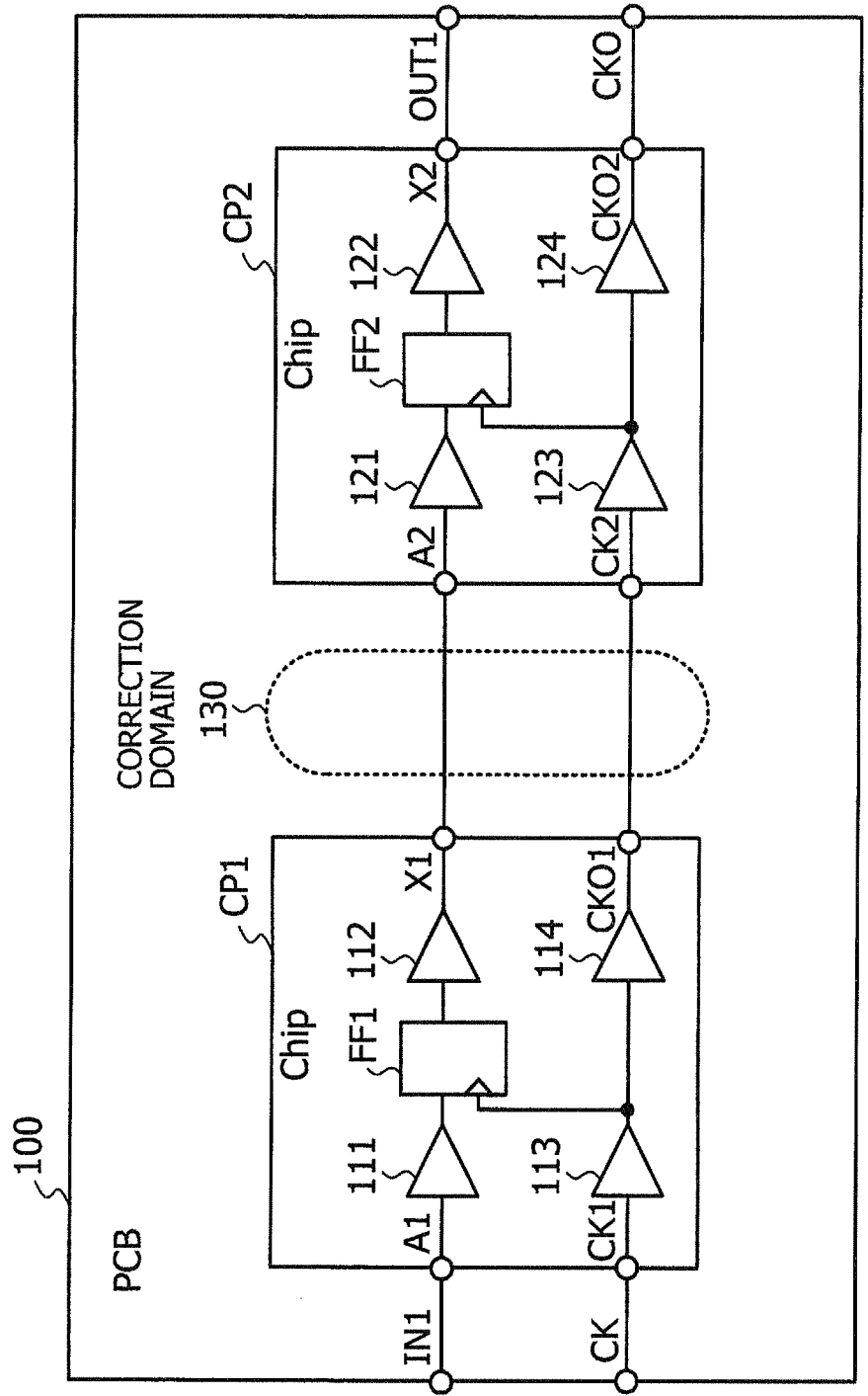
FIG. 2 illustrates a configuration of a PCB subjected to a signal delay evaluation process.

FIG. 2 illustrates an example configuration of a PCB, which is to be subjected to a signal delay evaluation process according to the present embodiment. The illustrated PCB 100 contains two semiconductor chips CP1 and CP2. The first semiconductor chip CP1 is formed from buffers 111 to 114 and a latch circuit FF1. The PCB 100 receives an input data signal at its input terminal IN1. This input data signal is supplied to an input terminal A1 of the first semiconductor chip CP1 and propagates through a buffer 111, latch circuit FF1, buffer 112, and output terminal X1 in that order before it is sent out to the second semiconductor chip CP2. The PCB 100 also receives a clock signal at its clock input terminal CK, which then propagates through a clock input terminal CK1, buffers 113 and 114, and clock output terminal CKO1 of the semiconductor chip CP1 in that order before it is sent out to the second semiconductor chip CP2. The latch circuit FF1 operates with this clock signal supplied via the buffer 113.

Similar to the above-described first semiconductor chip CP1, the second semiconductor chip CP2 is formed from four buffers 121 to 124 and one latch circuit FF2. The output data signal from the first semiconductor chip CP1 propagates through an input terminal A2, buffer 121, latch circuit FF2, and buffer 122, and output terminal X2 before it is sent out from an output terminal OUT1 of the PCB 100. Likewise, the clock output signal of the first semiconductor chip CP1 propagates through a clock input terminal CK2, buffers 123 and 124, and clock output terminal CKO2 of the second semiconductor chip CP2 before it is sent out from a clock output terminal CKO of the PCB 100. The latch circuit FF2 operates with the clock signal supplied from via buffer 123.

The semiconductor chips CP1 and CP2 mounted on the illustrated PCB 100 may either be a digital circuit or an analog circuit. Or they may be a hybrid circuit containing both digital and analog circuits. For example, the first semiconductor chip CP1 may contain a digital buffer 111 and an analog buffer 112.

In the above-described PCB 100, the first and second semiconductor chips CP1 and CP2 may have been designed on different platforms. If this is the case, the portion between those two semiconductor chips CP1 and CP2 is designated as a correction domain 130 in which a correction of slew rate and terminal-to-terminal delay Tpd will take place. More specifically, to calculate system-level signal delays of this PCB 100, the platform discriminator 11 identifies those semiconductor chips CP1 and CP2 as being based on different platforms and thus designates their boundary portion as a correction domain 130. The slew rate corrector 12 and correction value calculator 14 calculate values for correcting slew rates and terminal-to-terminal delays Tpd in that correction domain 130.

Figure 3:
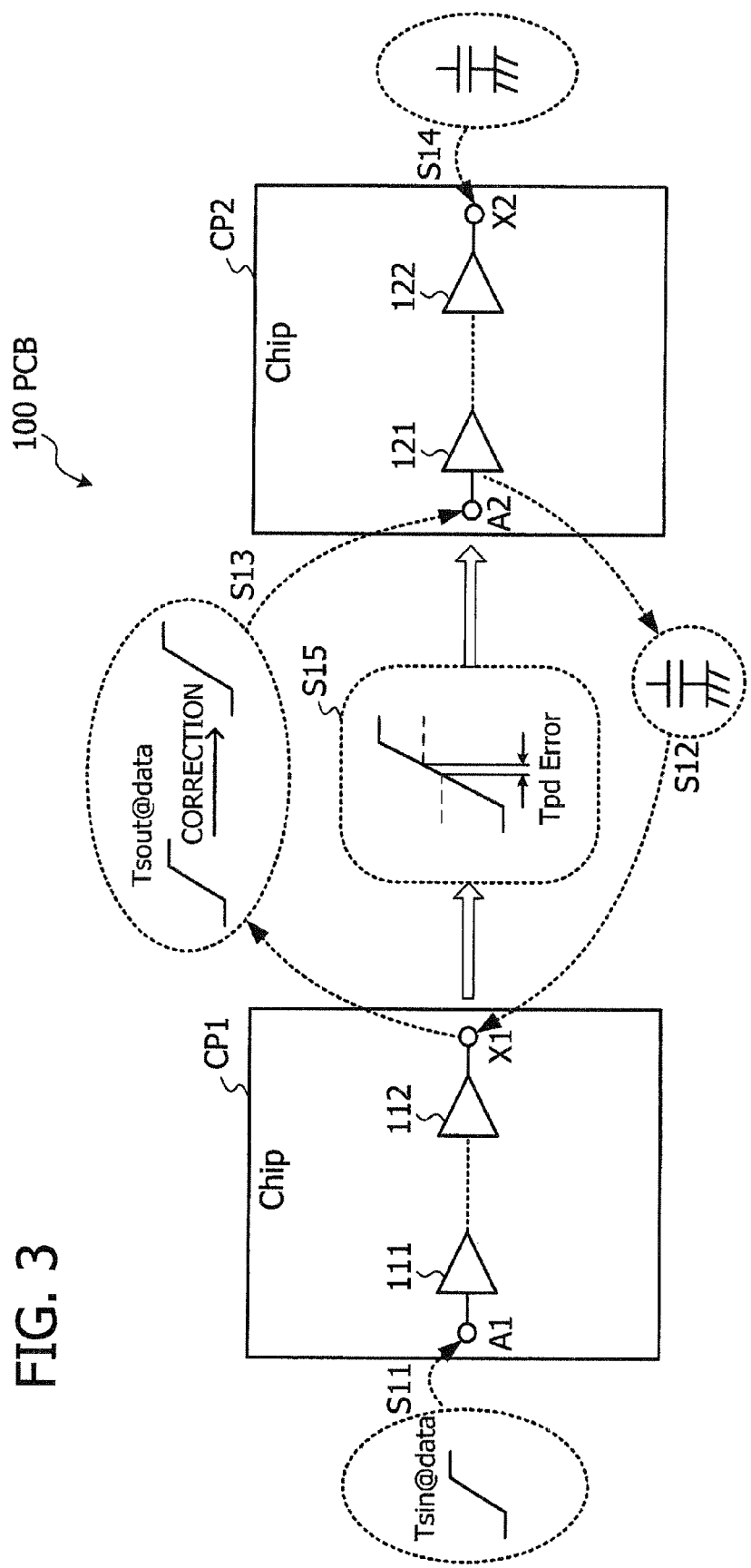
FIG. 3 illustrates a basic process flow of signal delay calculation.

FIG. 3 illustrates a basic process flow of signal delay calculation. As mentioned, circuit simulation and static timing analysis are performed as part of the process of designing an electronic device. For this purpose, signal delays in each semiconductor chip are calculated under a set of constraints such as input signal specifications and output load conditions. FIG. 3 explains an example of this calculation, with reference to the data signal path discussed above for the PCB 100.

The constraint generator 13 now defines constraints on the front-end cells of the first semiconductor chip CP1. In the present example, the buffer 111 receives a signal from some off-board source. The slew rate specification of this signal is an input slew rate constraint Tsin of the buffer 111 (step S11). The constraint generator 13 also defines constraints on the back-end cells of the first semiconductor chip CP1. In the present example, the constraint generator 13 calculates output load capacitance of the buffer 112 as a constraint, based on the input pin capacitance of the second semiconductor chip CP2 and its associated wire capacitance (step S12).

The output slew rate Tsout of a back-end cell of the first semiconductor chip CP1 is assigned as a constraint to a front-end cell of the second semiconductor chip CP2 which is driven by that back-end cell. For example, the output slew rate Tsout of the output buffer 112 serves as an input slew rate Tsin of the input buffer 121 (step S13) without being modified or corrected in the case where the second semiconductor chip CP2 is based on the same platform as the first semiconductor chip CP1. For back-end cells of the second semiconductor chip CP2, their output load capacitance is calculated as their constraints. In the present example, the output buffer 122 drives a signal that goes out of the PCB 100. The output load capacitance of the buffer 122 is thus calculated from, for example, the wiring capacitance of that signal line (step S14).

In the case where the second semiconductor chip CP2 is different from its preceding semiconductor chip CP1 in their slew rate platforms, the slew rate corrector 12 is activated in a correction domain 130 at their boundary, thus correcting the output slew rate Tsout of the back-end circuit of the first semiconductor chip CP1. The constraint generator 13 assigns this corrected parameter as a constraint on the corresponding front-end cell of the second semiconductor chip CP2 (step S13).

Figure 17A:
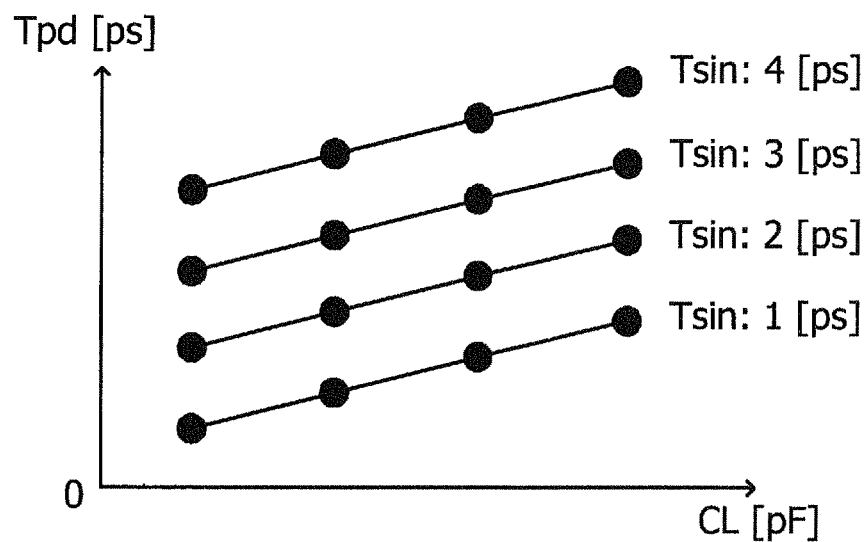
FIGS. 17A and 17B illustrate an example of tables included in a library.
Figure 17B:
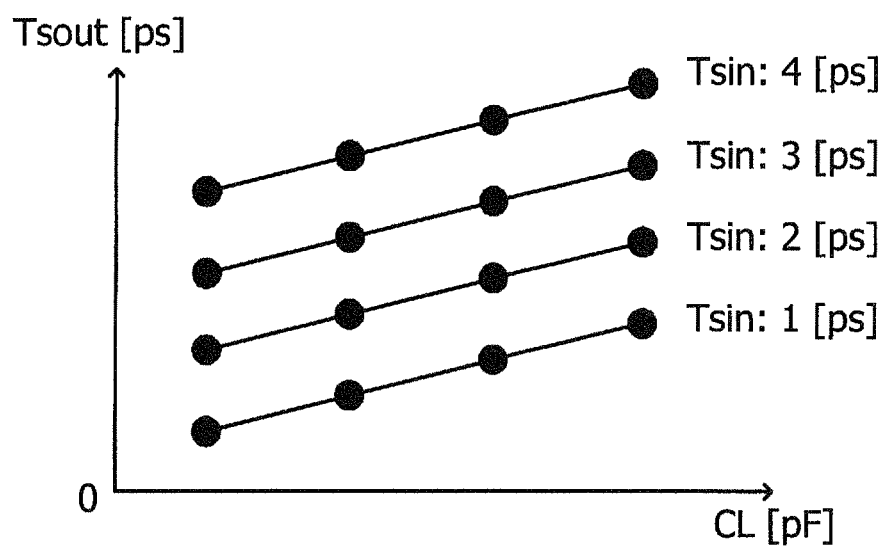
Figure 18:
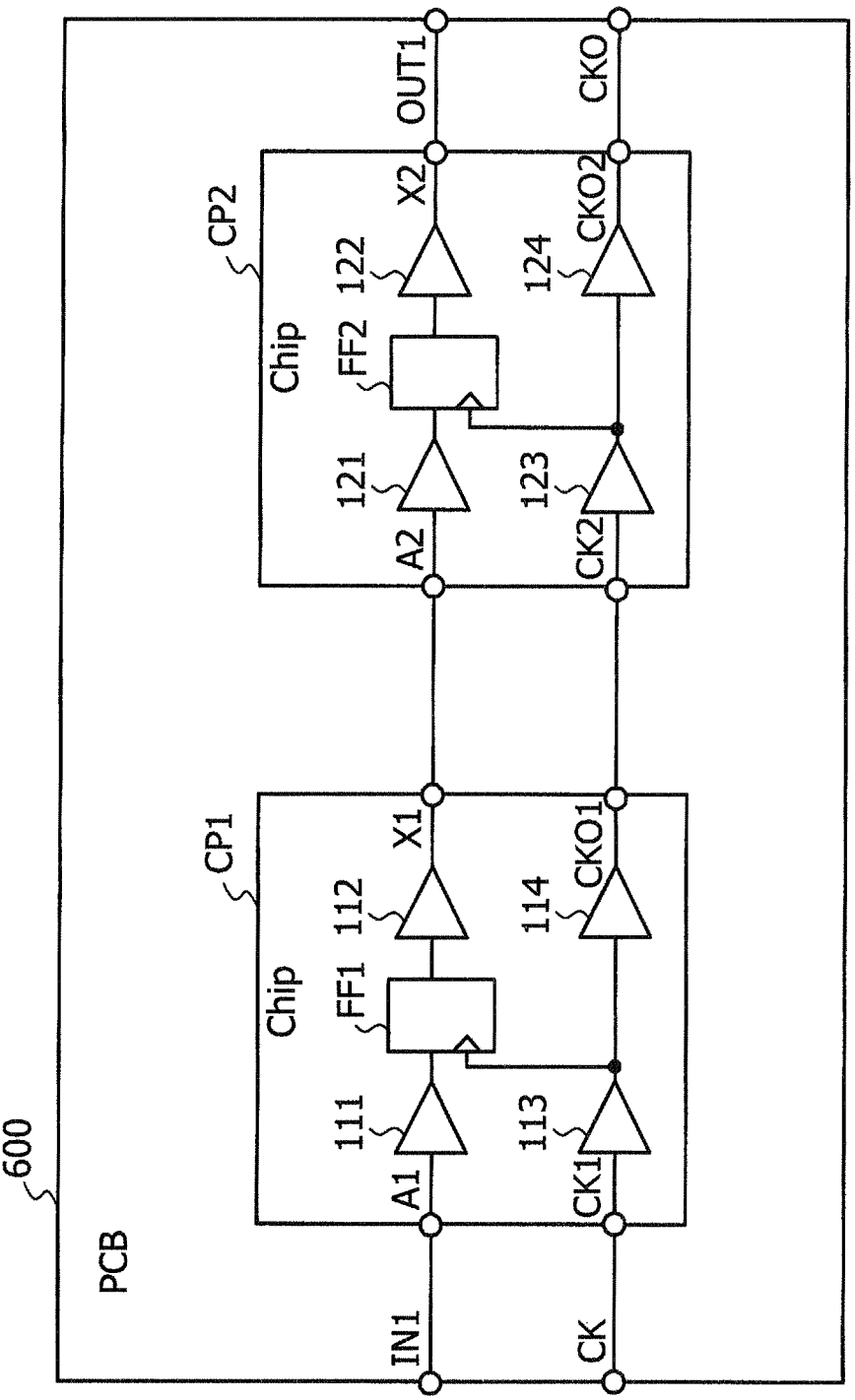
FIG. 18 illustrates an example of a structure of a PCB.
Figure 19:
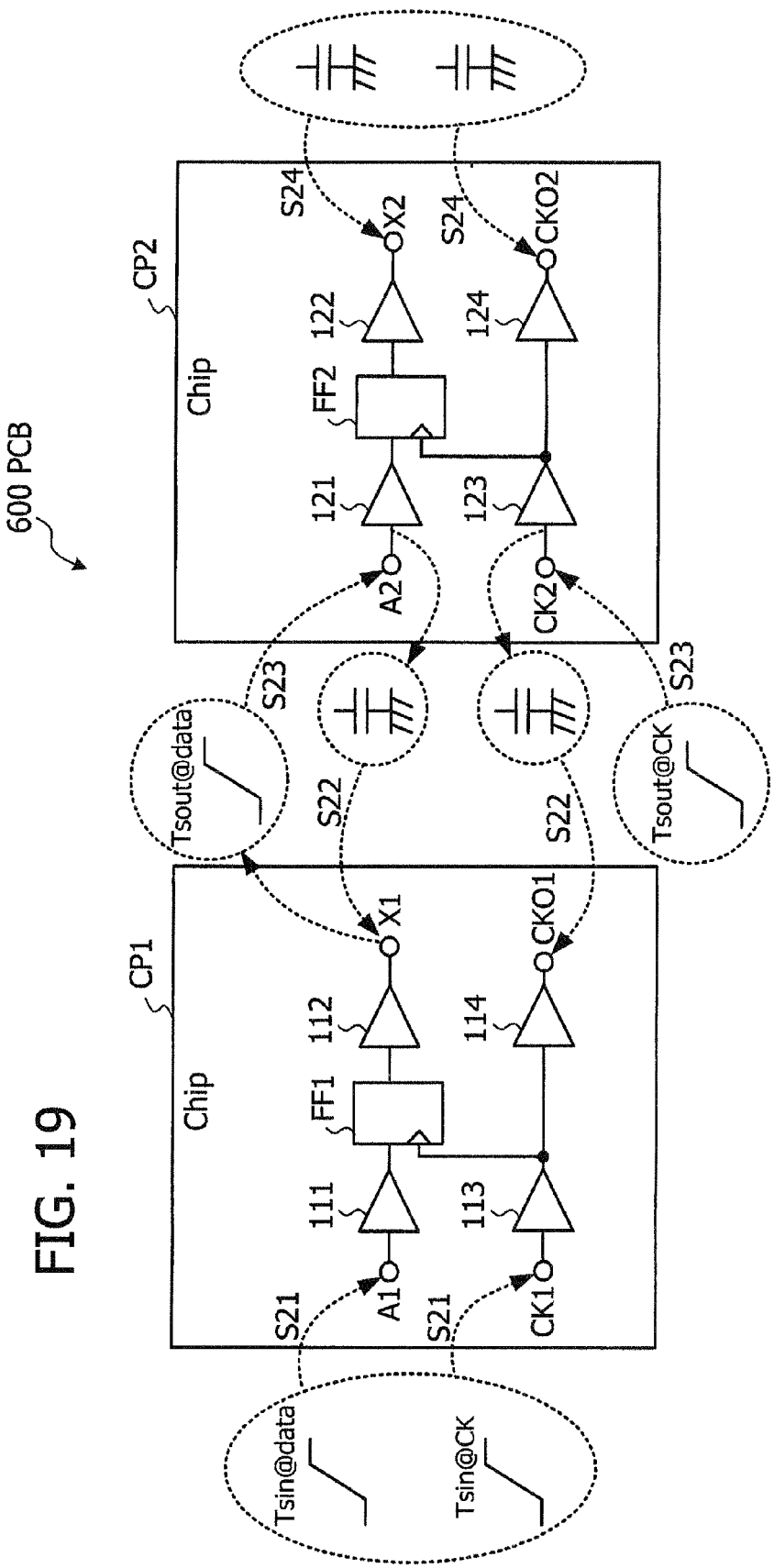
FIG. 19 illustrates individual timing verification of semiconductor chips in a PCB development process.
Figure 20:
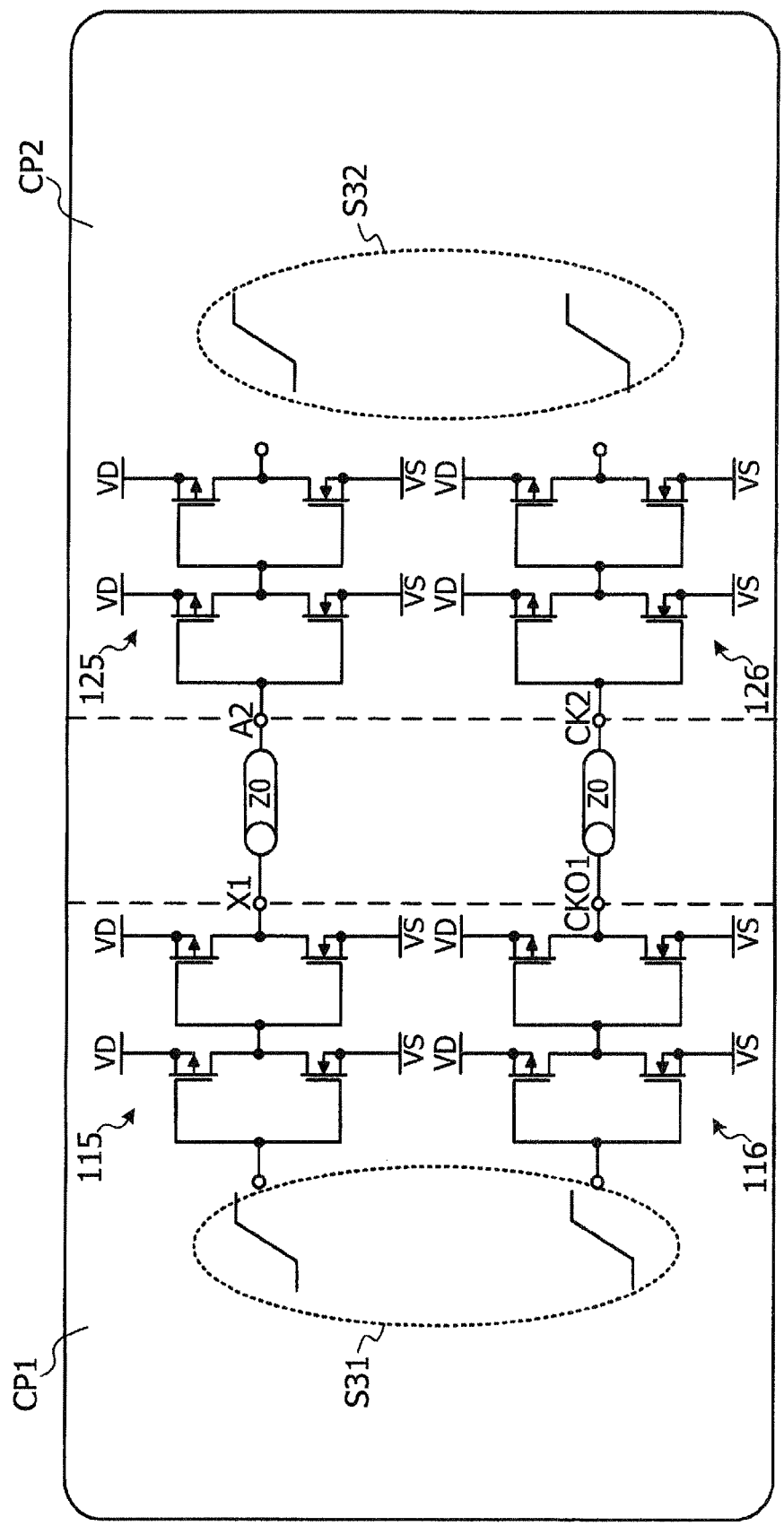
FIG. 20 illustrates chip-to-chip timing verification in a PCB development process.
Figure 21:
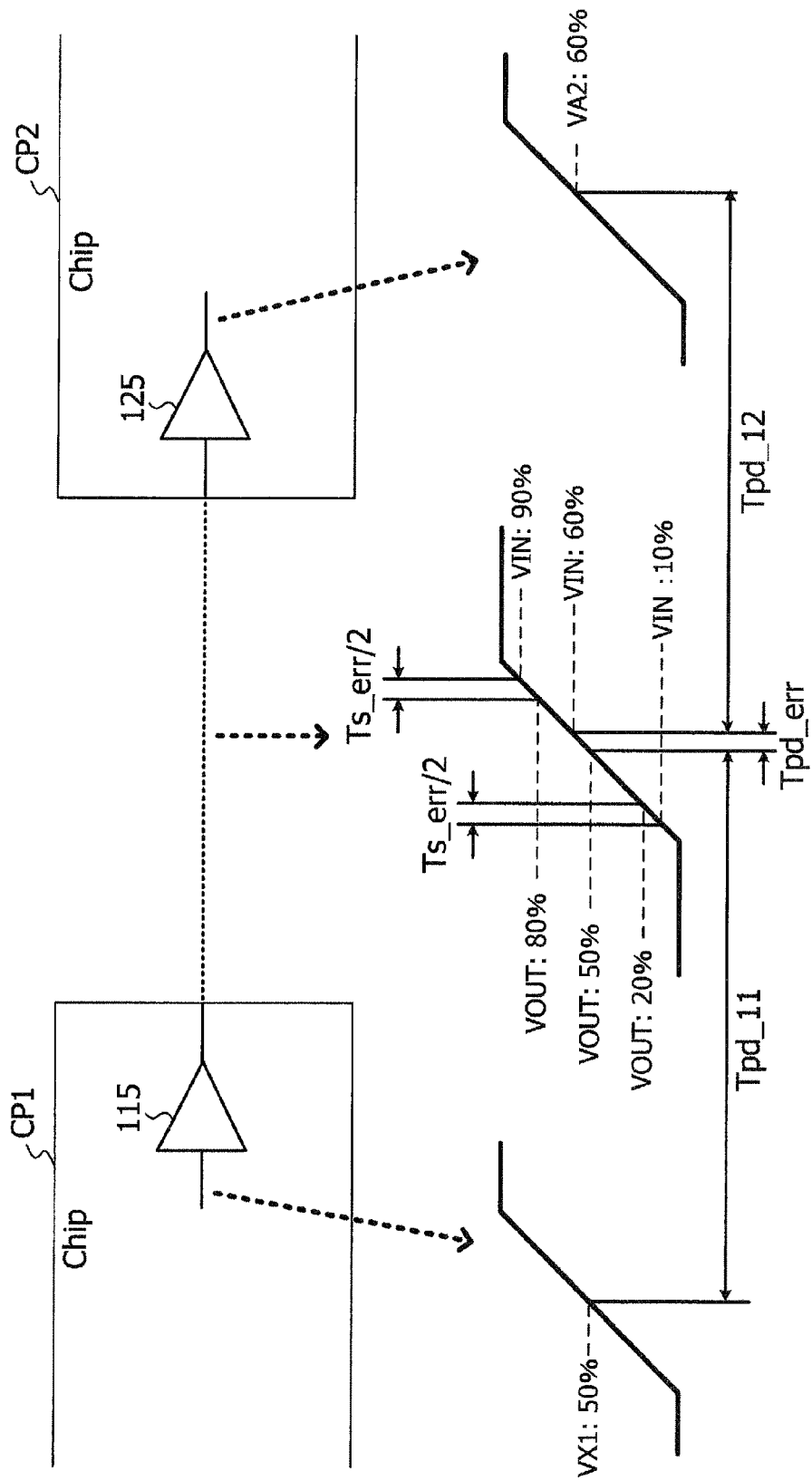
FIG. 21 illustrates delay data errors that could be introduced when evaluating signals propagating from one circuit block to another.

The constraints defined above are used to look up the Tpd table and Tsin table discussed in FIGS. 17A and 17B to obtain a value of terminal-to-terminal delay Tpd of each cell in the first and second semiconductor chips CP1 and CP2. The obtained Tpd value may, however, have some error in the case where those two semiconductor chips CP1 and CP2 are different in their terminal-to-terminal delay platforms. When this is the case, the correction value calculator 14 calculates a Tpd error in the correction domain 130, based on the output slew rate Tsout of back-end cells of the first semiconductor chip CP1, the obtained Tpd value, and information about the platforms of the first and second semiconductor chips CP1 and CP2 (step S15). The resulting terminal-to-terminal delays Tpd of each chip, together with their corresponding Tpd errors in the correction domain 130, permit the delay time calculator 15 to calculate system-level signal delays in the PCB 100.

FIGS. 4A and 4B illustrate specifications of cells in semiconductor chips. The following section will give a more specific example of the above-discussed delay correction, assuming that the cells in a semiconductor chip have uniform delay characteristics while their values are different from chip to chip as illustrated in FIGS. 4A and 4B. It is also assumed for simplicity that the dependence of cell delays on the output load capacitance is negligible.

Referring to FIG. 4A, the first semiconductor chip CP1 defines its input signal slew rate Tsin_1 and output slew rate Tsout_1 with two thresholds, Vth_s1 of 20% and Vth_e1 of 80% of full amplitude, which correspond to the beginning and end of a rising edge of signals. The first semiconductor chip CP1 also defines the terminal-to-terminal delay Tpd_1 of each cell with a threshold Vth_1 of 50% of full amplitude. Specifically, the output slew rate Tsout_1 is 60 ps when the input signal slew rate Tsin_1 is 60 ps. The terminal-to-terminal delay Tpd_1 is 100 ps.

Referring to FIG. 4B, the second semiconductor chip CP2, on the other hand, defines its input signal slew rate Tsin_2 and output slew rate Tsout_2 with two thresholds, Vth_s2 of 10% and Vth_e2 of 90% of full amplitude, which correspond to the beginning and end of a rising edge of signals. The second semiconductor chip CP2 also defines the terminal-to-terminal delay Tpd_2 of each cell with a threshold Vth_2 of 60% of full amplitude. Specifically, the output slew rate Tsout_2 is 80 ps when the input signal slew rate Tsin_2 is 80 ps. The terminal-to-terminal delay Tpd_2 is 100 ps.

Figure 5:
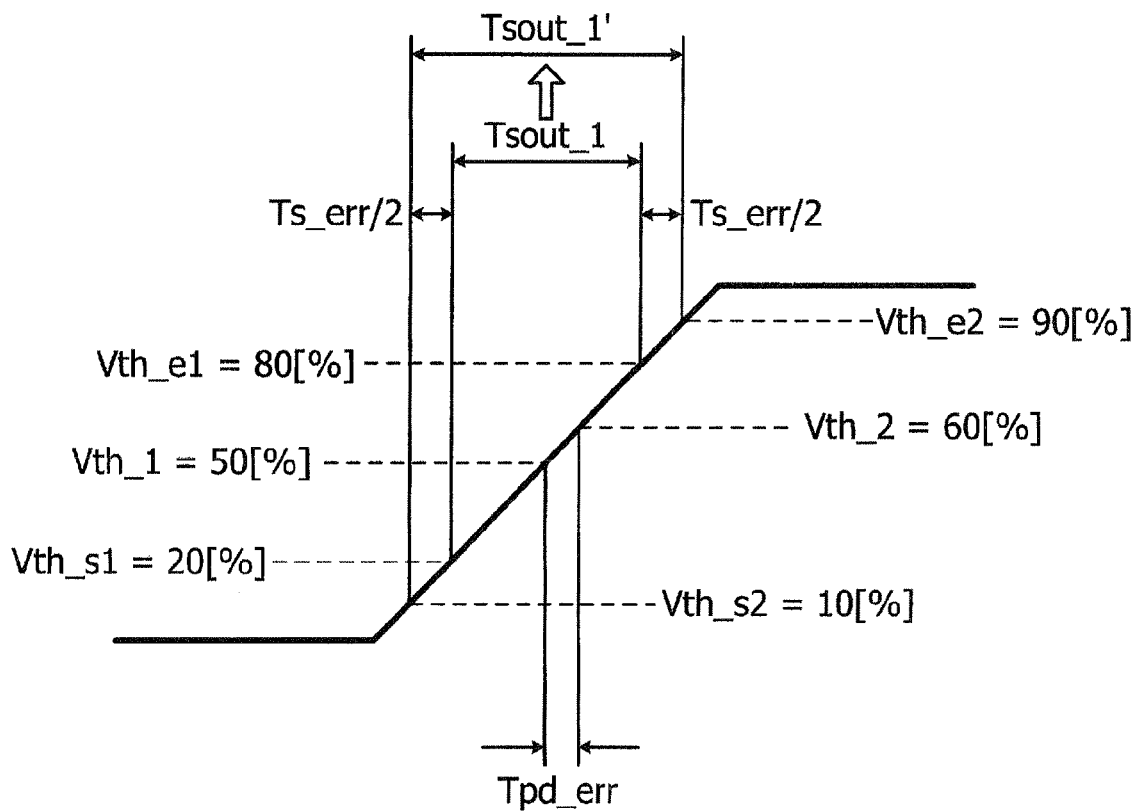
FIG. 5 illustrates how to calculate slew rate errors and Tpd errors.

FIG. 5 illustrates how to calculate slew rate errors and Tpd errors. The waveform seen in FIG. 5 is of an output signal of the first semiconductor chip CP1. The slew rate of this signal from the first semiconductor chip CP1 acts as part of constraints on the succeeding semiconductor chip CP2. Correction of slew rate thus takes place in the correction domain 130 (see FIG. 2), based on the information about platforms of the preceding semiconductor chip CP1 and succeeding semiconductor chip CP2, as well as on the output delay parameters (e.g., output slew rate Tsout_1 and terminal-to-terminal delay Tpd_1 of a buffer 112) of the preceding semiconductor chip CP1. Also evaluated in the correction domain 130 are Tpd errors.

Specifically, the slew rate is corrected as follows. Referring to FIG. 5, the preceding circuit defines its output slew rate Tsout_1 as a 20%-80% transition of output signals, whereas the succeeding circuit defines it as a 10%-90% transition. Let Tsout_1' represent the output slew rate to be passed to the succeeding circuit as part of its constraints. This Tsout_1' has thus to be a sum of the original output slew rate Tsout_1 and a slew rate error Ts_err estimated from the difference of threshold values.

More specifically, the corrected output slew rate Tsout_1' can be estimated by the following equation (1):

$$\text{Tsout\_1}' = \{\text{Tsout\_1}/(\text{Vth\_e1} - \text{Vth\_s1})\} \times (\text{Vth\_e2} - \text{Vth\_s2}) \quad (1)$$
$$= \{60/(80-20)\} \times (90-10)$$
$$= 80 \ [\text{ps}]$$

As can be seen from this equation, Tsout_1' is a function of threshold values used in the preceding and succeeding circuits and the original output slew rate Tsout_1 of the preceding circuit. That is, the slew rate corrector 12 calculates the difference between thresholds Vth_e1 and Vth_s1 of the preceding circuit, as well as the difference between thresholds Vth_e2 and Vth_s2 of the succeeding circuit. The slew rate corrector 12 corrects the original output slew rate Tsout_1 in accordance with the ratio between those two differences. The constraint generator 13 then assigns the corrected output slew rate Tsout_1' as input signal slew rate Tsin_2 of the succeeding circuit.

The Tpd error (Tpd_err), on the other hand, is determined as follows. The preceding and succeeding circuits have a difference of 10% in their thresholds for terminal-to-terminal delay Tpd. This difference may be interpreted as being equivalent to a Tpd error due to an output load capacitance. That is, it is possible to calculate a Tpd error from the slope of the output signal, i.e., the output slew rate Tsout_1 of the preceding circuit. More specifically, the correction value calculator 14 uses the following equation (2) to calculate a Tpd error.

$$Tpd\_err = \{Tsout\_1/(Vth\_e1 - Vth\_s1)\} \times (Vth\_2 - Vth\_1) \quad (2)$$
$$= \{60/(80-20)\} \times (60-50)$$
$$= 10 \ [ps]$$

Figure 6:
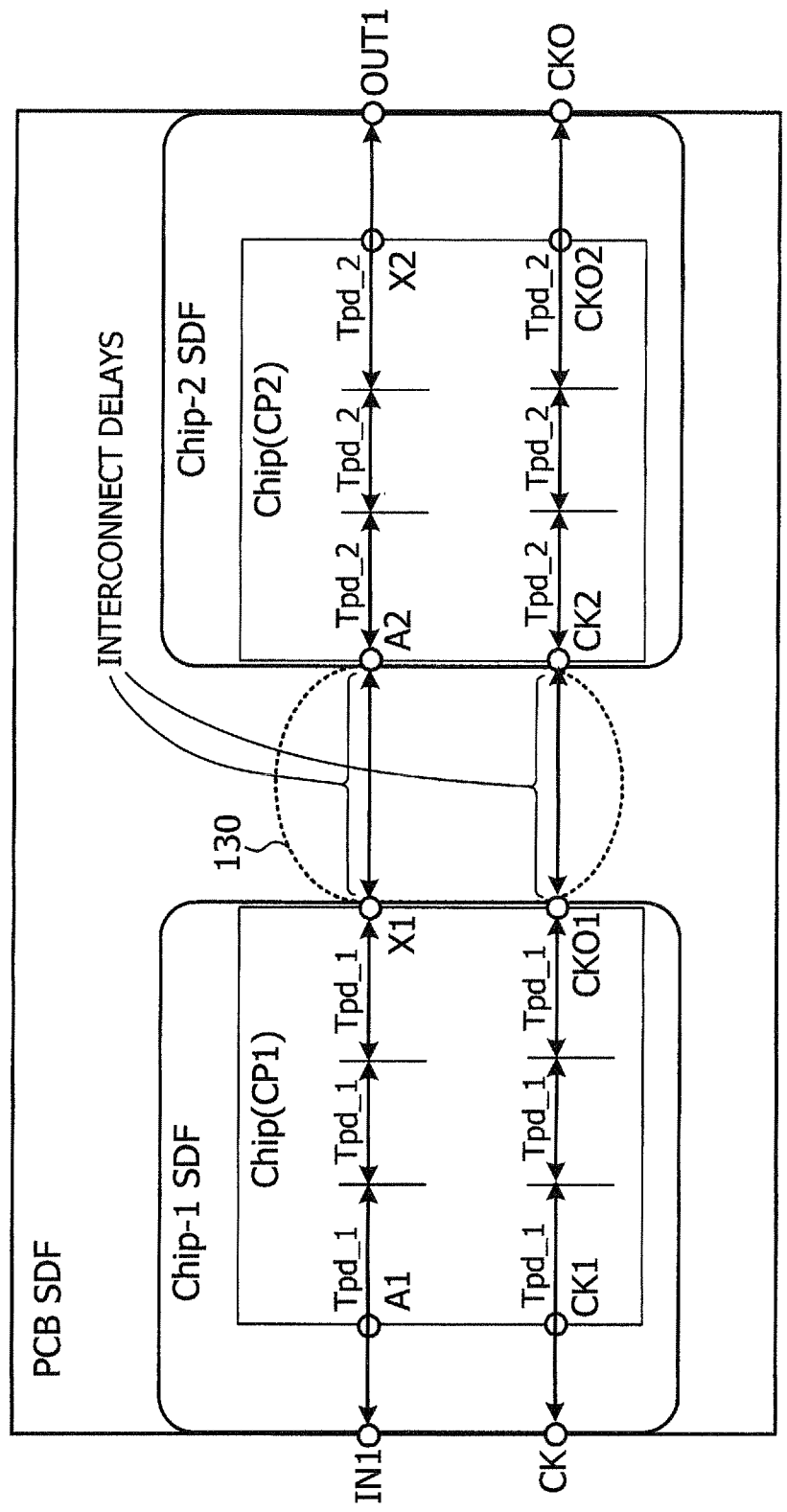
FIG. 6 illustrates calculation of system-level signal delays in a PCB.

FIG. 6 illustrates calculation of system-level signal delays of the circuit mounted on the PCB 100, in which delay time data is compiled in the Standard Delay Format (SDF). For example, the box named "Chip-1 SDF" in FIG. 6 represents delay data of a section from input terminals of the PCB 100 to output terminals of the first semiconductor chip CP1. The box named "Chip-2 SDF" in FIG. 6 represents delay data of a section from input terminals of the second semiconductor chip CP2 to output terminals of the PCB 100 first semiconductor chip CP1. Referring to the correction domain 130 between the two semiconductors chips CP1 and CP2, the delay data in this section is represented as interconnect delays in PCB SDF layer of the PCB 100.

With the delay data described above, the delay time calculator 15 calculates an end-to-end signal delay Tpd_total of a specific propagation path from, for example, input terminal IN1 to output terminal OUT1 of the PCB 100. This calculation may be expressed as follows.

$$Tpd\_total = Tpd\_1 + Tpd\_1 + Tpd\_1 + Tpd\_err + \quad (3)$$
$$Tpd\_2 + Tpd\_2 + Tpd\_2$$
$$= 610 \ [ps]$$

The above-described delay evaluation method enables direct calculation of system-level signal delays from libraries of circuit blocks contained in or mounted on the electronic device under evaluation, regardless of whether those circuit blocks are designed on different platforms (e.g., different vendors, different library specifications, or different delay calculation formulas). The foregoing conventional two-stage verification method ensures system-level timing design of an electronic device by combining verification of individual circuit blocks with that of boundary portions of circuit blocks. Compared with this conventional method, the method according to the present embodiment calculates system-level signal delays more accurately and thus contributes to improved design and manufacturing of function-rich electronic devices that can operate with better timing accuracy.

In the above example of FIG. 6, Tpd errors encountered in a correction domain 130 are handled as interconnect delays between chips, rather than as part of internal cell delays of the chips. The embodiments are, however, not limited to this specific handling of Tpd errors. For example, it is possible to add such Tpd errors to output-side delay data (i.e., handles them as part of the delays of back-end cells in the first semiconductor chip CP1). It is also possible to add such Tpd errors to input-side delay data (i.e., handles them as part of the delays of front-end cells in the second semiconductor chip CP2). Those alternative methods may be applied to, for example, the case where the delay data is stored in a format other than the SDF.

Yet another alternative method divides a Tpd error into two parts with an appropriate ratio. One is added to output-side delay data, the other is added to input-side delay data. This method applies the calculated correction values properly even in the case where an upper limit is set to cell delays, so that the verification of signal delays can adapt to a wider range of design rules.

Correction values in a correction domain 130 may not exactly be equal to the calculated Tpd errors, but can have some offset to the Tpd error values. When, for example, the designer of an electronic device may give a specific target value of signal delays. In this case, an offset determined from the target value is given to Tpd errors.

The above-described processing operations of the delay evaluation program may be implemented in an electronic device design system. Referring now to the block diagram of FIG. 7, the following section will describe an electronic device design system according to an embodiment of the present invention.

As an example, the illustrated system is formed from a terminal 210 and a server 220. The terminal 210 contains a central processing unit (CPU) 211 to control the terminal 210 as a whole by interacting with other components connected via a bus 217. The connected components are: a main storage device 212 formed from random access memory (RAM) and other devices, an external storage device 213 such as hard disk drives (HDDs), a graphics processor 214, an input device interface 215, and a communication interface 216.

The main storage device 212 serves as temporary storage for the whole or part of operating system (OS) programs and application programs that the CPU 211 executes. The application programs include several kinds of delay calculation programs 310, 320, and 330 (described later). The main storage device 212 may also store various data objects manipulated by the CPU 211 at runtime.

The external storage device 213 accommodates program files of the operating system and applications. In addition, the external storage device 213 stores data files used to run those programs. In the present example, design data 410, constraint data 420, and delay data 430 are stored for use with the delay calculation programs 310, 320, and 330.

The graphics processor 214 produces video images in accordance with drawing commands from the CPU 211 and displays them on the screen of a monitor 214a coupled thereto. The input device interface 215 is used to receive signals from external input devices, such as a keyboard 215a and a mouse 215b. Those input signals are supplied to the CPU 211 via the bus 217. The communication interface 216 is connected to an external network, allowing the CPU 211 to exchange data with the server 220 and other hosts (not shown) on the network.

Figure 7:
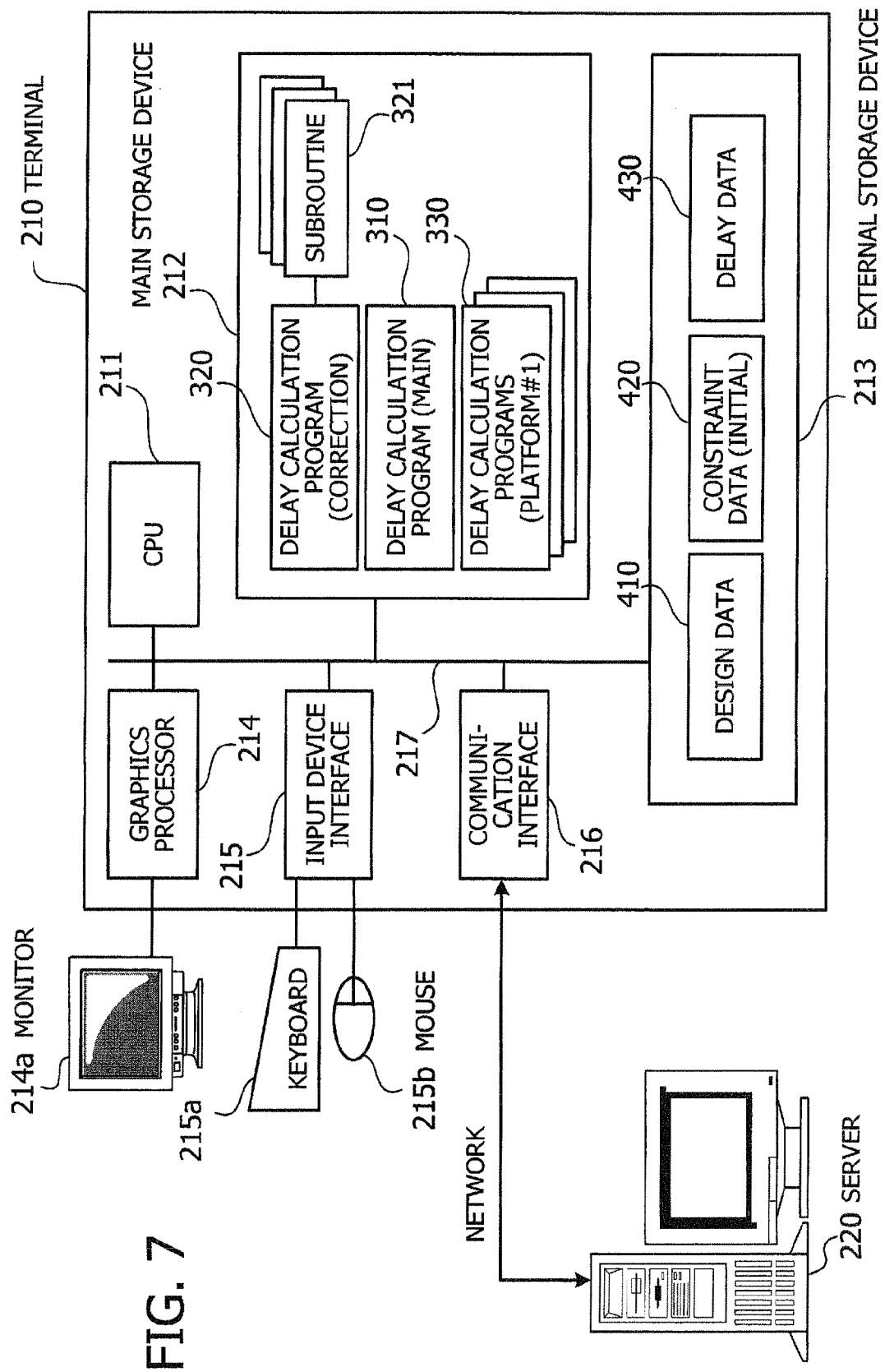
FIG. 7 illustrates an example of an electronic device design system according to an embodiment.

The processing functions of the present embodiment can be implemented on the above-described hardware structure. While FIG. 7 provides details only of the terminal 210, the illustrated hardware structure of the terminal 210 can also be applied to the server 220. Further, the illustrated configuration may be modified as necessary. For example, the design data 410, constraint data 420, and delay data 430 may be stored in a storage device in the server 220, rather than in the external storage device 213 of the terminal 210, so that the terminal 210 can download them via the network. Likewise, the delay calculation programs 310, 320, and 330 may also be stored in the server 220 for downloading by the terminal 210.

The terminal 210 executes a delay calculation program (main) 310, which is a main program of signal delay calculation. This delay calculation program (main) 310 offers the functions of the delay time calculator 15 discussed in FIG. 1.

The delay calculation program (correction) 320 corrects slew rates and terminal-to-terminal delays Tpd in the way discussed in an earlier section of this description, when the electronic device under evaluation contains circuit blocks designed on different platforms. This delay calculation program (correction) 320 offers the functions of the platform discriminator 11, slew rate corrector 12, constraint generator 13, and correction value calculator 14 discussed in FIG. 1. The delay calculation program (correction) 320 calls subroutines 321 during its execution.

Other delay calculation programs 330 are platform-specific programs used to calculate signal delays according to the specifications of each platform. Those delay calculation programs 330, as well as the foregoing delay calculation program (correction) 320, may be called by the delay calculation program (main) 310 or executed independently.

Design data 410 stored in the external storage device 213 is a collection of layout data and other information describing the design of the electronic device. Constraint data 420 associated with the design data 410 is also stored in the external storage device 213 to provide initial conditions necessary for calculation of signal delays. This constraint data 420 includes tables (e.g., those illustrated in FIGS. 17A and 17B) describing cell delays of circuit blocks that are to be laid out. Also included in the constraint data 420 is information about the platforms. Delay data 430 provides delay parameters of individual circuits corresponding to the design data 410.

FIG. 8 illustrates an example of platform data stored as part of the constraint data 420 to give an initial basis of constraints. The illustrated platform data 421 contains threshold values used to define terminal-to-terminal delays Tpd and slew rates of circuit blocks, each entry of which is designated by a platform name. The platform data may include two or more sets of such threshold parameters for one platform. This is to deal with different types of input and output interfaces. In the example of FIG. 8, each entry of the platform data 421 contains two sets of parameters, one for CMOS circuit and the other for Schmidt trigger circuit.

Referring now to the flowcharts of FIGS. 9 to 14, the following will describe what the terminal 210 does by running delay calculation programs 310, 320, and 330.

Figure 9:
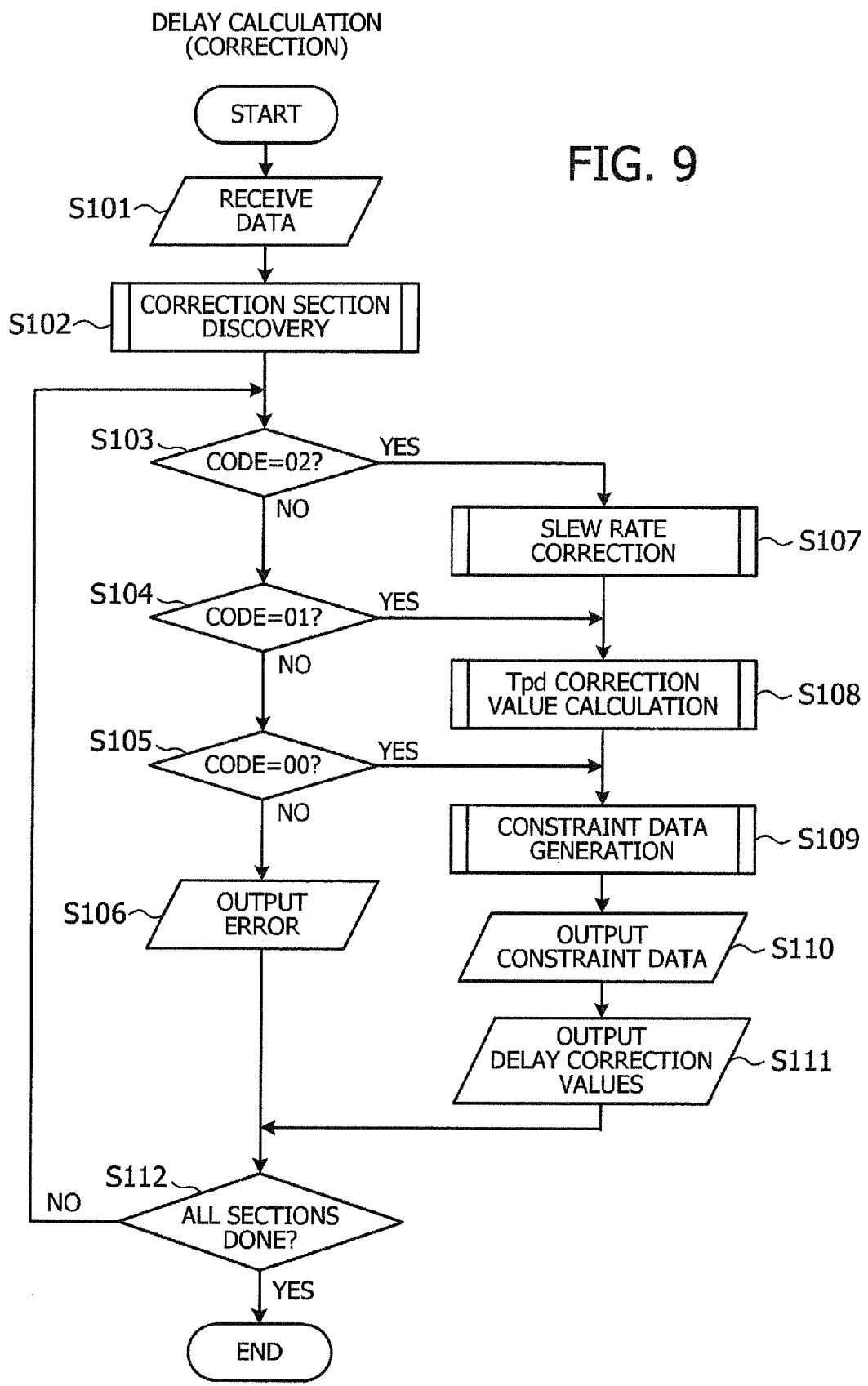
FIG. 9 is a flowchart illustrating a process executed by a delay calculation program for correction.

FIG. 9 is a flowchart illustrating a process executed by the delay calculation program (correction) 320. The illustrated process includes the following steps:

(Step S101) Design data 410, constraint data 420, and other pieces of information about the electronic device under evaluation are received through, for example, interactions with the user.

(Step S102) The CPU 211 calls a correction section discovery routine, which is one of the subroutines 321 mentioned above. As will be described later in FIG. 10, the correction section discovery routine produces boundary parameters that specify which sections of the electronic device need delay correction and which sections do not. Specifically, the correction section discovery routine provides a classification code for each portion interconnecting circuit blocks in the electronic device. The following steps S103 to S111 will be executed for each section identified and classified at step S102.

(Step S103) The CPU 211 determines whether the correction section of interest has a classification code of "02." If it is, the CPU 211 executes step S107. Otherwise, the CPU 211 proceeds to step S104.

(Step S104) The CPU 211 determines whether the correction section of interest has a classification code of "01." If it is, the CPU 211 executes step S108. Otherwise, the CPU 211 proceeds to step S105.

(Step S105) The CPU 211 determines whether the correction section of interest has a classification code of "00." If it is, the CPU 211 executes step S109. Otherwise, the CPU 211 proceeds to step S106.

(Step S106) Now that the above steps S103 to S105 have determined that the classification code matches with none of the tested values "00," "01," and "02," the CPU 211 indicates an error on a monitor screen or the like.

(Step S107) The CPU 211 calls a slew rate correction routine, which is one of the subroutines 321. This routine calculates a corrected slew rate for use in later routines to determine constraints or terminal-to-terminal delays Tpd. Details of this slew rate correction routine will be described later in FIG. 11.

(Step S108) The CPU 211 calls a Tpd correction value calculation routine, another one of the subroutines 321, to calculate correction values (e.g., Tpd error) for use in a later routine to correct system-level signal delays. This step S108 may use a corrected version of slew rate values in the case where step S107 has been executed. Details of the Tpd correction value calculation routine will be described later in FIG. 12.

(Step S109) The CPU 211 calls a constraint data generation routine, yet another one of the subroutines 321, to create a data file (or files) describing constraints on a specific correction section in the electronic device for use in signal delay calculation. This step S109 uses a corrected version of slew rate values in the case where step S107 has been executed. Details of the constraint data generation routine will be described later in FIG. 13.

(Step S110) The CPU 211 outputs the constraint data file created at step S109. For example, this file, which corresponds to the constraint data 420, may be stored in the external storage device 213 or the like.

(Step S111) The CPU 211 outputs the Tpd correction values calculated at step S108. For example, those Tpd correction values may be registered as an additional part of the delay data 430. Or, they may be stored in the external storage device 213 or the like, being associated with the delay data 430.

(Step S112) The CPU 211 determines whether the above processing of steps S103 to S111 has been executed for all correction sections. If not, the CPU 211 chooses the next correction section and goes back to step S103. If all sections have been finished, the CPU 211 exits from the present routine.

As can be seen from the above, both slew rates and terminal-to-terminal delays Tpd are corrected in the code-02 sections, and only terminal-to-terminal delays Tpd in the code-01 sections. Those corrections made to slew rates and delays are reflected in their corresponding constraints.

Figure 10:
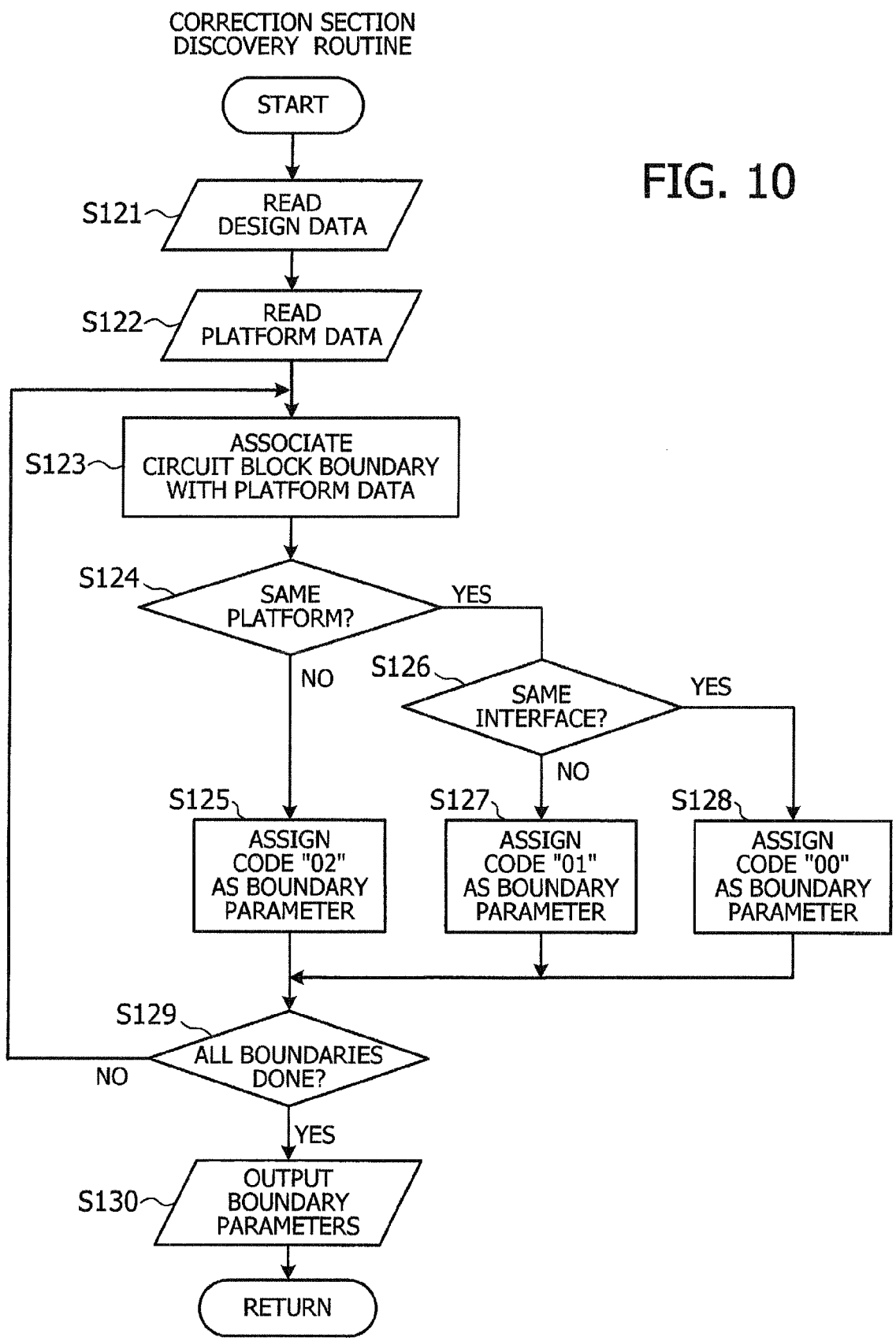
FIG. 10 is a flowchart of a correction section discovery routine.

FIG. 10 is a flowchart illustrating what the correction section discovery routine does. This routine includes the following steps:

(Step S121) The CPU 211 reads design data of the electronic device under evaluation.

(Step S122) The CPU 211 reads platform data 421 of every circuit block contained in the electronic device.

(Step S123) The CPU 211 selects one of the boundaries between circuit blocks in the electronic device and associates it with the platform data related to that boundary.

(Step S124) The CPU 211 determines whether the circuit block on one side (e.g., output side) of the boundary is based on the same platform as the circuit block on the other side (e.g., input side) of the boundary. Referring here to the platform data 421 of FIG. 8, it is determined whether the two platforms in question have the same platform name. If their platform names are different, it is then determined whether their Tpd thresholds and slew rate thresholds are different. If a mismatch is found in either one of those thresholds, the CPU 211 concludes that the two platforms in question are different, and thus advances to step S125. Otherwise, the CPU 211 proceeds to step S126.

(Step S125) The CPU 211 assigns a classification code "02" as a boundary parameter for the selected boundary.

(Step S126) Based on the platform data 421, the CPU 211 determines whether the output interface on the output side of the selected boundary is identical with the input interface on the input side of the boundary. If so, the CPU 211 advances to step S128. If not, the CPU 211 proceeds to step S127.

(Step S127) The CPU 211 assigns a classification code "01" as a boundary parameter for the selected boundary.

(Step S128) The CPU 211 assigns a classification code "00" as a boundary parameter for the selected boundary.

(Step S129) The CPU 211 determines whether all boundaries have obtained their classification codes. If there remain boundaries with no classification codes, the CPU 211 returns to step S123 to select and process such a boundary. If all boundaries have their classification codes, the CPU 211 proceeds to step S130.

(Step S130) Now that all boundaries have their classification codes, the CPU 211 outputs their boundary parameters to, for example, the external storage device 213. The CPU 211 then returns to the delay calculation program (correction) 320.

The above-described correction section discovery routine assigns a classification code "02" so that both the slew rate correction routine and Tpd correction value calculation routine will be executed if there is a difference in either the Tpd threshold or slew rate threshold. That routine may, however, be modified to determine the necessity of Tpd correction values and slew rate collection values individually by testing the Tpd and slew rate thresholds, such that one or both of the corresponding routines will be executed depending on their necessity.

Figure 11:
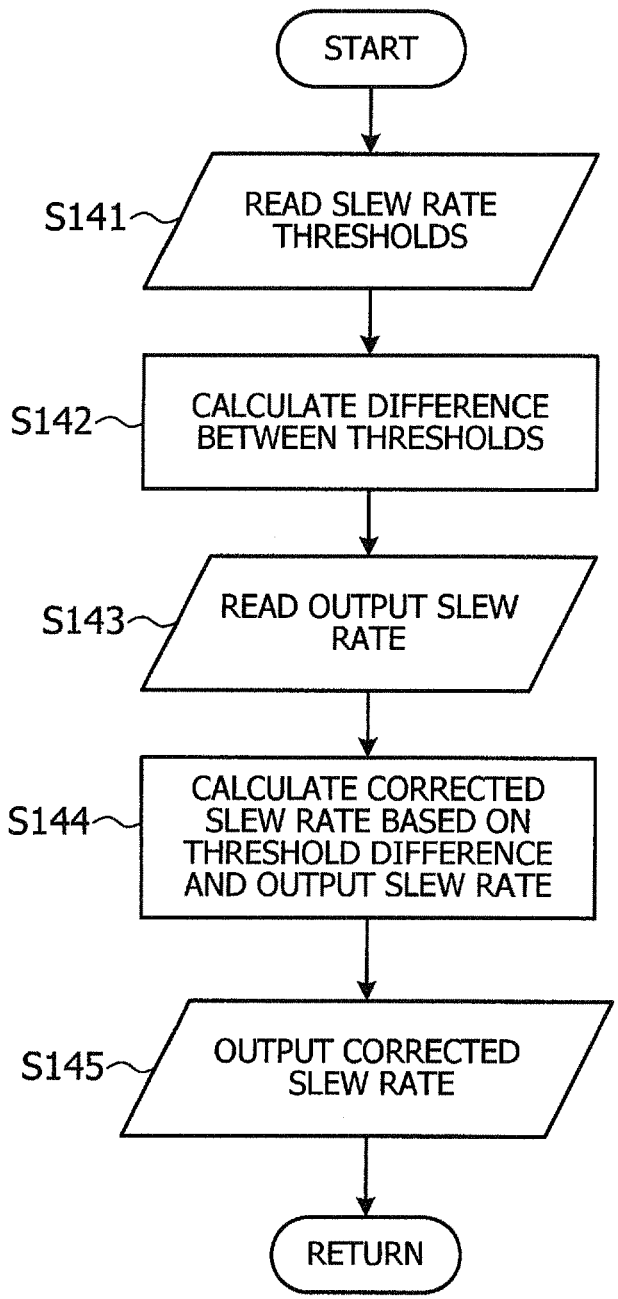
FIG. 11 is a flowchart of a slew rate correction routine.

FIG. 11 is a flowchart illustrating what the slew rate correction routine does. This routine includes the following steps:

(Step S141) The CPU 211 reads slew rate threshold values out of the stored platform data 421. More specifically, the CPU 211 reads threshold values used to define output slew rates and input slew rates in a specified correction section. Here the output and input slew rates denote slew rates on the output side and input side of the currently selected boundary.

(Step S142) The CPU 211 calculates a difference between thresholds. Specifically, this step calculates the terms (Vth_e1−Vth_s1) and (Vth_e2−Vth_s2) in the foregoing equation (1).

(Step S143) The CPU 211 reads an output slew rate in the specified correction section.

(Step S144) With the above threshold differences and the original output slew rate, the CPU 211 calculates a corrected output slew rate according to equation (1).

(Step S145) The CPU 211 outputs the corrected output slew rate. For example, the CPU 211 saves the output slew rate in the external storage device 213, associating it with the constraint data 420.

Figure 12:
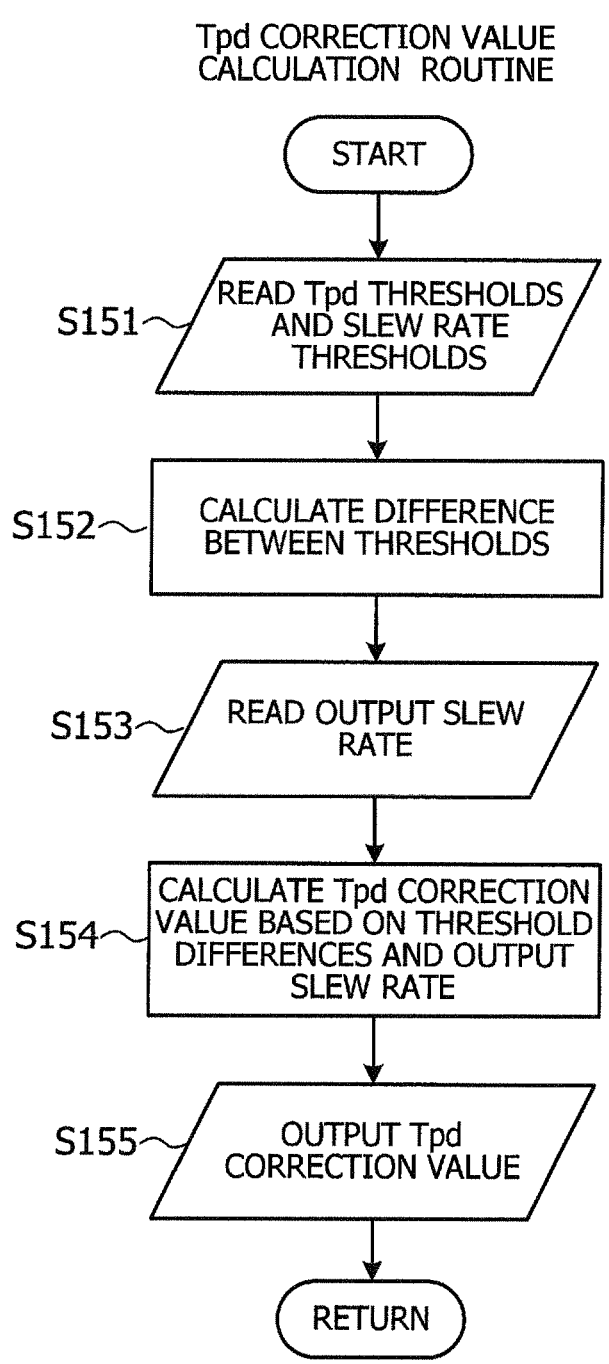
FIG. 12 is a flowchart of a Tpd correction value calculation routine.

FIG. 12 is a flowchart illustrating what the Tpd correction value calculation routine does. This routine includes the following steps:

(Step S151) The CPU 211 consults the stored platform data 421 to read Tpd threshold values in a specified correction section. More specifically, the CPU 211 reads a threshold value defining terminal-to-terminal delays Tpd on the output side of the currently selected boundary, as well as that on the input side of the boundary. The CPU 211 also reads threshold values of output slew rates, together with those of input slew rates.

(Step S152) The CPU 211 calculates the difference between the Tpd thresholds and that between the output slew rate thresholds that have been read at step S151. The former difference corresponds to the term (Vth_2−Vth_1), and the latter difference to the term (Vth_e1−Vth_s1), in the foregoing equation (2).

(Step S153) The CPU 211 reads the output slew rate value in the correction section.

(Step S154) The CPU 211 calculates a Tpd correction value (i.e., Tpd error described earlier) according to equation (2), based on the threshold differences calculated at step S152 and the output slew rate value read at step S153.

(Step S155) The CPU 211 outputs the calculated Tpd correction value. For example, the CPU 211 saves the Tpd correction value in the external storage device 213, associating it with the delay data 430.

Figure 13:
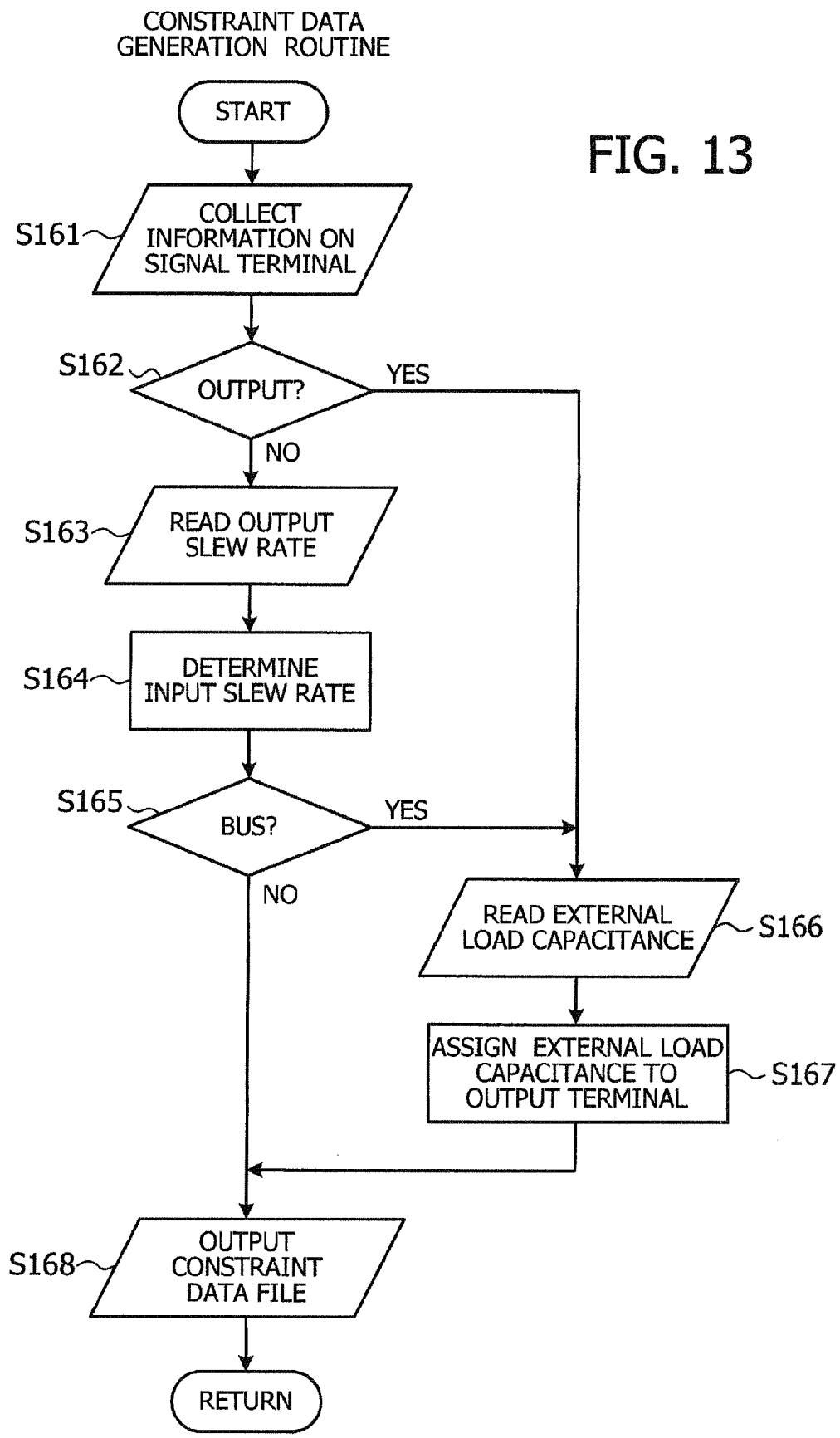
FIG. 13 is a flowchart of a constraint data generation routine.

FIG. 13 is a flowchart illustrating what the constraint data generation routine does. This routine includes the following steps:

(Step S161) The CPU 211 collects information (e.g., design data) on a specified signal terminal on which constraints will be placed.

(Step S162) The CPU 211 determines whether the signal terminal in question is an output terminal. If so, the CPU 211 proceeds to step S166. If not, the CPU 211 advances to step S163.

(Step S163) Now that the signal terminal is found not to be an output terminal, the CPU 211 assumes that the terminal in question is an input terminal and thus reads the output slew rate of an output signal associated with that input terminal. This output slew rate value may have been subjected to the foregoing slew rate correction routine. When this is the case, the CPU 211 obtains the corrected output slew rate value.

(Step S164) The CPU 211 assigns the output slew rate value obtained at step S163 to the signal terminal (input terminal) as its input slew rate.

(Step S165) The CPU 211 determines whether the signal terminal in question is part of a bus. If so, the CPU 211 advances to step S166. If not, the CPU 211 proceeds to step S168.

(Step S166) The CPU 211 reads an external load capacitance corresponding to the signal terminal (output terminal).

(Step S167) The CPU 211 assigns the external load capacitance obtained at step S166 to the signal terminal (output terminal). In the case where step S165 has identified this signal terminal as being a bus, it means that the terminal can operate as an output terminal because of its bidirectional capabilities. Accordingly, steps S166 to S167 define an external load capacitance for the bidirectional signal terminal, considering its operation as an output terminal.

(Step S168) The CPU 211 outputs a constraint data file containing the values assigned at step S164 and S167. For example, the CPU 211 saves that file in the external storage device 213.

While it is not described explicitly, the constraint data generation routine actually determines constraints for both output terminals and input terminals in a single boundary section.

Figure 14:
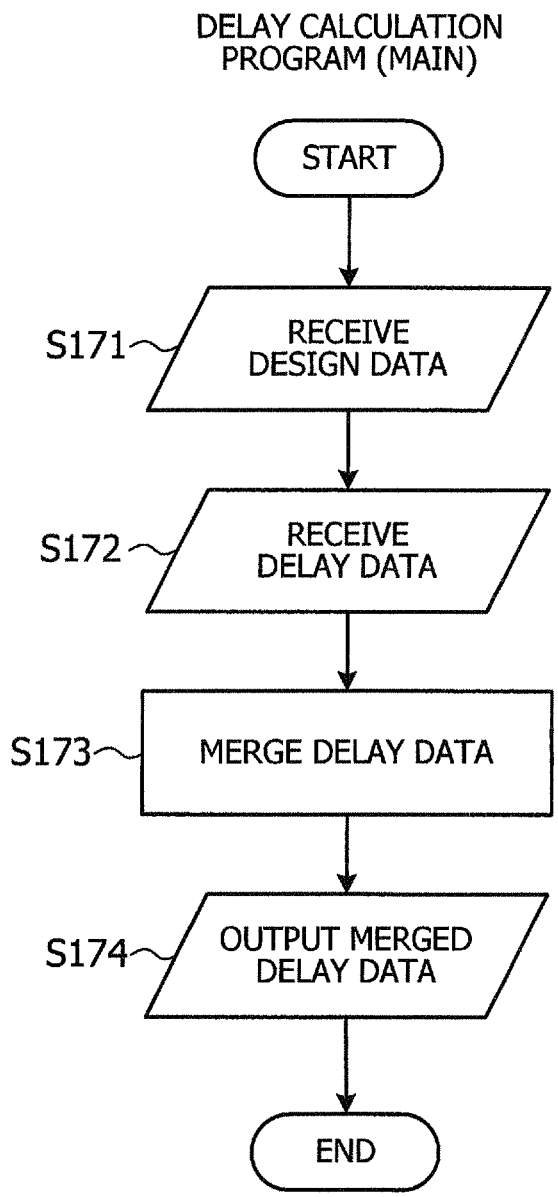
FIG. 14 is a flowchart illustrating a main process of the delay calculation program.
Figure 15:
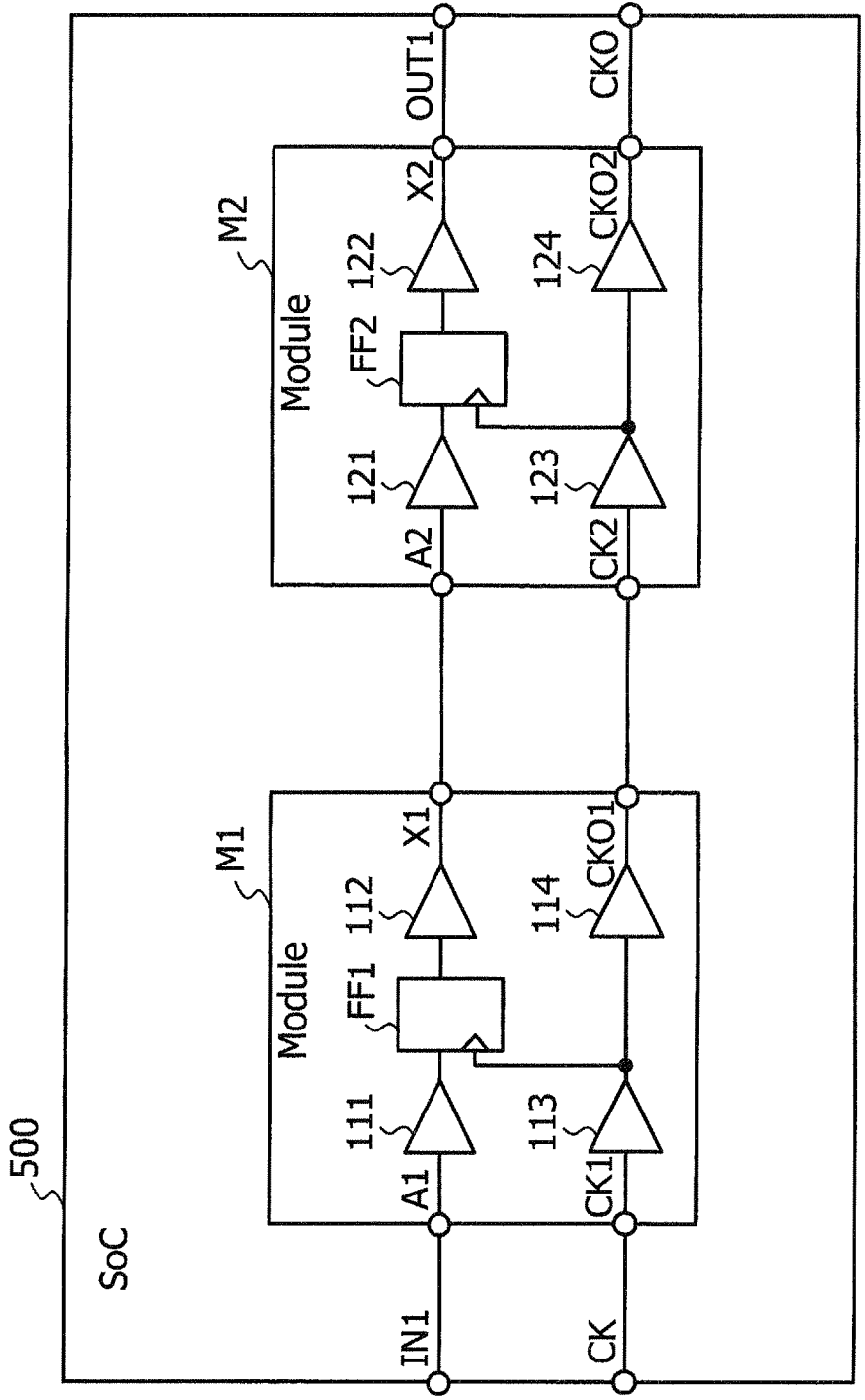
FIG. 15 illustrates an example of a SoC device.
Figure 16:
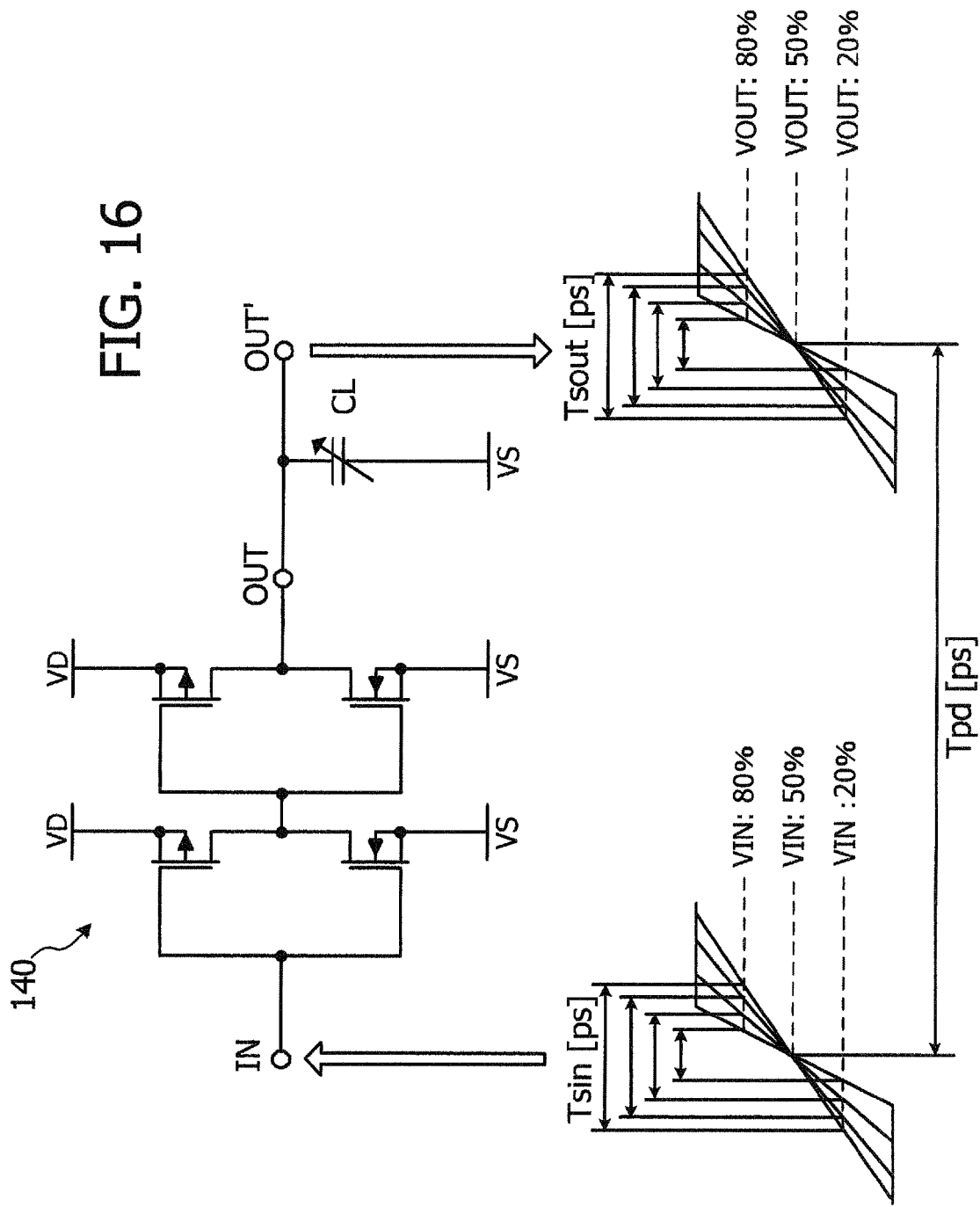
FIG. 16 illustrates an example of library specifications used for delay verification.

FIG. 14 is a flowchart illustrating what the delay calculation program (main) 310 does. The illustrated process includes the following steps:

(Step S171) Through, for example, interactions with the user, the CPU 211 receives design data of an electronic device subjected to delay calculation.

(Step S172) Through, for example, interactions with the user, the CPU 211 receives delay data of cells constituting the specified electronic device. This delay data includes Tpd correction values calculated in the foregoing Tpd correction value calculation routine. The delay data also includes constraints of each circuit block in the electronic device. Corrections made by the foregoing slew rate correction routine have been reflected in those constraints.

The delay calculation program (main) 310 may be configured to run automatically after the foregoing delay calculation program (correction) 320 is finished. Or those programs may be combined together. In those cases, steps S171 and S172 may read data from the external storage device 213 automatically, without user intervention.

(Step S173) The CPU 211 merges the received delay data 430 of the whole electronic device and calculates system-level signal delays in the way discussed in FIG. 6. During the course of this delay calculation, the CPU 211 loads and executes delay calculation programs 330 corresponding to the platforms of individual circuit blocks. Step S173 may alternatively be configured to solely output files of a database that provides signal delays of every cell in every boundary section.

(Step S174) The CPU 211 outputs the delay data merged at step S173. For example, the CPU 211 saves the merged delay data in the external storage device 213. This delay data enables more accurate timing verification of the electronic device.

The above-described program compensates for the difference of platforms in both slew rate and terminal-to-terminal delay Tpd. The actual implementations of the program may, however, assume that either the slew rate or terminal-to-terminal delay is fixed. For example, in the case where the circuit blocks share the same platform for slew rate definitions, the program includes a Tpd correction value calculation routine, but may omit a slew rate correction routine. It is also possible to omit a part of the constraint data generation routine which reflects correction of slew rate values. In the case where the circuit blocks share the same Tpd platform, the program may omit a Tpd correction value calculation routine.

The above-described processing functions of slew rate correction and Tpd correction may be implemented on a computer system. For example, the foregoing terminal 210 is supposed to provide the correction functions. The instructions describing those functions are encoded and provided in the form of computer programs (e.g., delay calculation programs 310 and 320). A computer system executes such programs to provide the above-described processing functions. The programs may be stored in a computer-readable medium for the purpose of storage and distribution. Suitable computer-readable storage media include magnetic storage devices, optical discs, magneto-optical storage media, semiconductor memory devices, and other tangible storage media.

Portable storage media, such as optical discs, may be used for distribution and sales of program products. Network-based distribution of software programs may also be possible, in which case several master program files are made available on a server computer for downloading to other computers via a network. A user computer stores necessary software components in its local storage unit, which have previously been installed from a portable storage media or downloaded from such a server computer. The user computer executes the programs read out of the local storage unit, thereby performing the programmed functions. Where appropriate, the user computer may directly execute program codes read out of the portable storage medium, without installing them in its local storage device. It is also possible for the user computer to dynamically download programs from a server computer when they are demanded, and execute them upon delivery.

According to the signal delay evaluation program described in the above embodiments, it is determined whether the reference levels used to define slew rates of a first circuit block are different from those used for a second circuit block that receives an output signal from the first circuit block. If this condition is true, the output slew rate of the first circuit block is corrected based on a slew rate error corresponding to the difference in those reference levels. The corrected output slew rate is used to evaluate system-level signal delays (i.e., end-to-end delays of signals propagating through multiple circuit blocks) of the electronic device, with an improved accuracy even in the case where the circuit blocks are defined on the basis of different slew rate reference levels.

According to the proposed signal delay evaluation program, it is also determined whether the terminal-to-terminal delay reference levels used to define terminal-to-terminal delay data of the first circuit block are different from those used for the second circuit block. If this condition is true, an error of the terminal-to-terminal delay data is calculated based on the difference in those terminal-to-terminal delay reference levels, so that the value of that error will be used as a terminal-to-terminal delay correction value. The corrected output slew rate is used to evaluate end-to-end delays of signals propagating through multiple circuit blocks of the electronic device, with an improved accuracy even in the case where the circuit blocks are defined on the basis of different terminal-to-terminal delay reference levels.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A non-transitory computer-readable storage medium storing a computer program for evaluating signal propagation delays in an electronic device including a plurality of circuit blocks, the computer program, when executed on a computer, causing the computer to perform a method comprising:

determining whether first reference voltage levels used to define a first output slew rate of an output signal supplied from a first circuit block is different from second reference voltage levels used to define an input slew rate of an input signal supplied to a second circuit block from the first circuit block, the first reference voltage levels comprising a first start threshold voltage level and a first end threshold voltage level to determine a start point and an end point, respectively, of rising or falling edges of the output signal, the second reference voltage levels comprising a second start threshold voltage level and a second end threshold voltage level to determine a start point and an end point, respectively, of rising or falling edges of the input signal; and correcting the first output slew rate based on slew rate errors corresponding to the differences between the first reference voltage levels and the second reference voltage levels, wherein:

the first start threshold voltage level and the first end threshold voltage level are higher than a minimum voltage level of the output signal and are lower than a maximum voltage level of the output signal; and the second start threshold voltage level and the second end threshold voltage level are higher than a minimum voltage level of the input signal and are lower than a maximum voltage level of the input signal.

2. The non-transitory computer-readable storage medium according to claim 1, wherein said correcting of the first output slew rate obtains a corrected output slew rate by calculating a ratio of a difference between the second start threshold voltage level and the second end threshold level to a difference between the first start threshold voltage level and the first end threshold level and multiplying the first output slew rate by the calculated ratio.

3. The non-transitory computer-readable storage medium according to claim 1, wherein the method executed by the computer further comprises:

assigning the corrected output slew rate of the output signal to the second circuit block as a constraint on signal delay calculation of a front-end cell in the second circuit block when the first reference voltage levels have been found to be different from the second reference voltage levels by said determining.

4. The non-transitory computer-readable storage medium according to claim 3, wherein the method executed by the computer further comprises:

determining a second output slew rate of the front-end cell in the second circuit block according to the corrected output slew rate assigned as a constraint thereon, by consulting a delay evaluation library for the second circuit block, when the first reference voltage levels have been found to be different from the second reference voltage levels by said determining.

5. The non-transitory computer-readable storage medium according to claim 3, wherein the method executed by the computer further comprises:

producing terminal-to-terminal delay data at a front-end cell of the second circuit block by consulting a delay evaluation library for the second circuit block, together with the corrected output slew rate assigned as a constraint, when the first reference voltage levels have been found to be different from the second reference voltage levels by said determining.

6. The non-transitory computer-readable storage medium according to claim 1, wherein the method executed by the computer further comprises:

determining whether terminal-to-terminal delay reference levels used to define the terminal-to-terminal delay data of cells in the first circuit block are different from those used for the second circuit block; and calculating an error of the terminal-to-terminal delay data of cells based on the difference in the terminal-to-terminal delay reference levels that is found between the first and second circuit blocks and outputting that error as a terminal-to-terminal delay correction value.

7. The non-transitory computer-readable storage medium according to claim 6, wherein the method executed by the computer further comprises:

correcting the terminal-to-terminal delay data of cells constituting the first and second circuit blocks by using the terminal-to-terminal delay correction value; and calculating an end-to-end signal delay of the first and second circuit blocks, based on the corrected terminal-to-terminal delay data of cells.

8. The non-transitory computer-readable storage medium according to claim 7, wherein:

the terminal-to-terminal delay reference levels are each specified as a ratio to a full amplitude of a propagating signal; and said calculation of an error as a terminal-to-terminal delay correction value is achieved by dividing the first output slew rate, subtracting the terminal-to-terminal delay reference level of the first circuit block from that of the second circuit block, and multiplying the quotient of said division by the remainder of said subtraction; and said calculation of an end-to-end signal delay adds the terminal-to-terminal delay correction value to a sum of signal delays calculated for the cells in the first and second circuit blocks.

9. The non-transitory computer-readable storage medium according to claim 7, wherein said calculation of an end-to-end signal delay handles the terminal-to-terminal delay correction value as part of a signal delay in a boundary section between the first and second circuit blocks.

10. The non-transitory computer-readable storage medium according to claim 7, wherein said calculation of an end-to-end signal delay handles the terminal-to-terminal delay correction value as part of a signal delay of a back-end cell in the first circuit block by adding the terminal-to-terminal delay correction value thereto.

11. The non-transitory computer-readable storage medium according to claim 7, wherein said calculation of an end-to-end signal delay handles the terminal-to-terminal delay correction value as part of a signal delay of a front-end cell in the second circuit block by adding the terminal-to-terminal delay correction value thereto.

12. The non-transitory computer-readable storage medium according to claim 7, wherein said calculation of an end-to-end signal delay divides the terminal-to-terminal delay correction value into first and second correction values, handles the first correction value as part of a signal delay of a back-end cell in the first circuit block by adding the first correction value thereto, and handles the second correction value as part of a signal delay of a front-end cell in the second circuit block by adding the second correction value thereto.

13. A non-transitory computer-readable storage medium storing a computer program for evaluating signal propagation delays in an electronic device including a plurality of circuit blocks, the computer program, when executed on a computer, causing the computer to execute a method comprising:

determining whether a first reference voltage level used to define terminal-to-terminal delay data of cells in a first circuit block are different from a second reference voltage level used to define terminal-to-terminal delay data of cells in a second circuit block that receives an output signal from the first circuit block; and calculating an error of the terminal-to-terminal delay data of cells based on the difference between the first reference voltage level and the second reference voltage level and outputting that error as a terminal-to-terminal delay correction value.

14. An apparatus for evaluating signal propagation delays in an electronic device including a plurality of circuit blocks, the apparatus comprising:
a platform discriminator to determine whether first reference voltage levels used to define an output slew rate of an output signal supplied from a first circuit block is different from second reference voltage levels used to define an input slew rate of an input signal supplied to a second circuit block from the first circuit block, the first reference voltage levels comprising a first start threshold voltage level and a first end threshold voltage level to determine a start point and an end point, respectively, of rising or falling edges of the output signal, the second reference voltage levels comprising a second start threshold voltage level and a second end threshold voltage level to determine a start point and an end point, respectively, of rising or falling edges of the input signal; and
a slew rate corrector to correct the output slew rate based on the difference between the first reference voltage levels and the second reference voltage levels, wherein:
the first start threshold voltage level and the first end threshold voltage level are higher than a minimum voltage level of the output signal and are lower than a maximum voltage level of the output signal; and
the second start threshold voltage level and the second end threshold voltage level are higher than a minimum voltage level of the input signal and are lower than a maximum voltage level of the input signal.

* * * * *